United States Patent
Kamat et al.

(10) Patent No.: US 10,730,266 B2
(45) Date of Patent: Aug. 4, 2020

(54) CLAD ALUMINUM ALLOY PRODUCTS

(71) Applicant: Novelis Inc., Atlanta, GA (US)

(72) Inventors: Rajeev G. Kamat, Marietta, GA (US);
Hashem Mousavi-Anijdan, Kennesaw, GA (US); Rahul Vilas Kulkarni, Marietta, GA (US); Juergen Timm, Steisslingen (DE); Corrado Bassi, Salgesch (CH); Robert Bruce Wagstaff, Greenacres, WA (US); Guillaume Florey, Veyras (CH); Cyrille Bezencon, Chermignon (CH); Samuel R. Wagstaff, Marietta, GA (US); David Leyvraz, Sierre (CH)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 15/959,516

(22) Filed: Apr. 23, 2018

(65) Prior Publication Data
US 2018/0304584 A1    Oct. 25, 2018

Related U.S. Application Data

(60) Provisional application No. 62/488,997, filed on Apr. 24, 2017.

(51) Int. Cl.
| | | |
|---|---|---|
| *B32B 15/01* | (2006.01) | |
| *C22C 21/02* | (2006.01) | |
| *C22C 21/08* | (2006.01) | |
| *C22C 21/10* | (2006.01) | |
| *C22F 1/053* | (2006.01) | |

(52) U.S. Cl.
CPC ............ *B32B 15/016* (2013.01); *B32B 15/01* (2013.01); *C22C 21/02* (2013.01); *C22C 21/08* (2013.01); *C22C 21/10* (2013.01); *C22F 1/053* (2013.01); *Y10T 428/12764* (2015.01)

(58) Field of Classification Search
None
See application file for complete search history.

(56) References Cited

U.S. PATENT DOCUMENTS

| 6,153,854 A | 11/2000 | Haszler et al. |
| 7,472,740 B2 | 1/2009 | Anderson et al. |
| (Continued) | | |

FOREIGN PATENT DOCUMENTS

| EP | 2110235 | 10/2009 |
| EP | 2581218 | 4/2013 |
| (Continued) | | |

OTHER PUBLICATIONS

PCT/US2018/028803, "International Search Report and Written Opinion," dated Jun. 19, 2018; 13 pages.

(Continued)

*Primary Examiner* — Daniel J. Schleis
(74) *Attorney, Agent, or Firm* — Kilpatrick Townsend & Stockton LLP

(57) ABSTRACT

Provided herein are new clad aluminum alloy products and methods of making these alloys. These alloy products possess a combination of strength and other key attributes, such as corrosion resistance, formability, and joining capabilities. The alloy products can be used in a variety of applications, including automotive, transportation, and electronics applications.

13 Claims, 22 Drawing Sheets

(56) References Cited

U.S. PATENT DOCUMENTS

| | | |
|---|---|---|
| 7,748,434 B2 | 7/2010 | Wagstaff |
| 7,968,211 B2 | 6/2011 | De Smet et al. |
| 8,420,226 B2 | 4/2013 | Ehrstrom et al. |
| 8,927,113 B2 | 1/2015 | Anderson et al. |
| 9,249,484 B2 | 2/2016 | Kamat et al. |
| 2012/0090742 A1* | 4/2012 | Smeyers ............ C22C 21/10 148/701 |
| 2013/0216790 A1* | 8/2013 | Smeyers ............ C22C 21/10 428/174 |
| 2013/0228252 A1 | 9/2013 | Smeyers et al. |
| 2014/0125090 A1 | 5/2014 | Braunschweig |
| 2015/0020930 A1 | 1/2015 | Kamat et al. |
| 2015/0217813 A1* | 8/2015 | Smeyers ............ B32B 15/016 428/654 |
| 2016/0122852 A1 | 5/2016 | Kamat et al. |

FOREIGN PATENT DOCUMENTS

| | | |
|---|---|---|
| WO | 9824571 | 6/1998 |
| WO | 2010142579 | 12/2010 |
| WO | 2012059505 | 5/2012 |
| WO | 2013041396 | 3/2013 |
| WO | 2014040939 | 3/2014 |

OTHER PUBLICATIONS

Kumar et al., "Influence of temper on the performance of a high-strength Al—Zn—Mg alloy sheet in the warm forming processing chain", Journal of Materials Processing Technology 231 (2016): 189-198.

\* cited by examiner

CLAD ALUMINUM ALLOY PRODUCTS

CROSS-REFERENCE TO RELATED APPLICATION

The present application claims the benefit of U.S. Provisional Application No. 62/488,997, filed Apr. 24, 2017, the disclosure of which is hereby incorporated by reference in its entirety.

FIELD

Provided herein are novel clad aluminum alloy products and methods of making these alloy products. The clad alloy products are suitable for a variety of applications, including automotive and electronic applications. The clad alloy products display high strength and corrosion resistance properties.

BACKGROUND

To reduce the weight of automobiles and meet Corporate Average Fuel Economy (CAFE) standards for carbon emissions, the automotive industry has increasingly substituted aluminum alloys for steel. Aluminum alloys, being lighter in weight, help reduce the overall automobile weight, which reduces fuel consumption. However, the introduction of aluminum alloys creates its own set of needs.

To be useful in automobile applications, an aluminum alloy product must offer the best combination of high strength and other key attributes, such as corrosion resistance, formability, and joining ability. Among different series of aluminum alloys, 7xxx series aluminum alloys are prime candidates for high end strength applications. However, for 7xxx series alloys, an increase in strength typically results in a lowering of the aforementioned key attributes. For example, strength and corrosion resistance performance tend to be inversely related for 7xxx series alloys, meaning that while the alloys have high strength, the corrosion resistance performance is limited.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Provided herein are new clad aluminum alloy-containing products and methods of making these alloy products. These alloy products possess a combination of strength and other key attributes, such as corrosion resistance, formability, and joining capabilities. Joining methods can include, but are not limited to, resistance spot welding (RSW), friction stir welding, remote laser welding, metal inert gas (MIG) welding, tungsten inert gas (TIG) welding, adhesive bonding, and self-piercing riveting. The alloy products can be used in a variety of applications, including automotive, transportation, electronics, and other applications.

The clad aluminum alloy products described herein comprise a core layer comprising up to 12.0 wt. % Zn, 1.0 to 4.0 wt. % Mg, 0.1 to 3.0 wt. % Cu, up to 0.60 wt. % Si, up to 0.50 wt. % Fe, up to 0.20 wt. % Mn, up to 0.20 wt. % Cr, up to 0.30 wt. % Zr, up to 0.15 wt. % impurities, and the balance aluminum, wherein the core layer has a first side and a second side; and a first cladding layer on the first side of the core layer, wherein the first cladding layer comprises up to about 7.0 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum. Throughout this application, all elements are described in weight percentage (wt. %) based on the total weight of the alloy. In some cases, the core layer comprises about 5.0 to 9.5 wt. % Zn, 1.2 to 2.3 wt. % Mg, 0.10 to 2.6 wt. % Cu, up to 0.10 wt. % Si, up to 0.15 wt. % Fe, up to 0.05 wt. % Mn, up to 0.05 wt. % Cr, up to 0.25 wt. % Zr, up to 0.15 wt. % impurities, and the balance aluminum.

In some cases, the first cladding layer comprises up to about 6.0 wt. % Zn, 0.1 to 3.5 wt. % Mg, up to 0.3 wt. % Cu, 0.05 to 0.40 wt. % Si, 0.20 to 0.40 wt. % Fe, 0.10 to 0.80 wt. % Mn, up to 0.30 wt. % Cr, up to 0.25 wt. % Zr, up to 0.15 wt. % impurities, and the balance aluminum. In some cases, the first cladding layer comprises up to about 1.3 wt. % Zn, 0.05 to 2.0 wt. % Mg, up to 0.35 wt. % Cu, 0.6 to 13.5 wt. % Si, 0.10 to 0.80 wt. % Fe, up to 0.80 wt. % Mn, up to 0.35 wt. % Cr, up to 0.30 wt. % Zr, up to 0.15 wt. % impurities, and the balance aluminum. In some cases, the first cladding layer comprises up to about 0.5 wt. % Zn, 4.0 to 4.8 wt. % Mg, up to 0.1 wt. % Cu, 0.05 to 0.2 wt. % Si, 0.20 to 0.40 wt. % Fe, 0.1 to 0.8 wt. % Mn, up to 0.2 wt. % Cr, up to 0.25 wt. % Zr, up to 0.15 wt. % impurities, and the balance aluminum.

Optionally, the core layer has a thickness of about 0.5 to 3 mm (e.g., from about 0.7 to about 2.3 mm or from about 1 mm to about 2 mm). In some cases, the first cladding layer can have a thickness of about 1% to 25% of the total clad product thickness (e.g., from about 1% to about 12% of the total clad product thickness or about 10% of the total clad product thickness).

The clad aluminum alloy product described herein can further comprise a second cladding layer located on the second side of the core layer. The first cladding layer and the second cladding layer can comprise the same or different alloys. The second cladding layer can comprise up to about 7.0 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum. In some cases, the second cladding layer can comprise up to about 6.0 wt. % Zn, 0.1 to 3.5 wt. % Mg, up to 0.3 wt. % Cu, 0.05 to 0.40 wt. % Si, 0.20 to 0.40 wt. % Fe, 0.10 to 0.80 wt. % Mn, up to 0.30 wt. % Cr, up to 0.25 wt. % Zr, up to 0.15 wt. % impurities, and the balance aluminum.

Optionally, the clad aluminum alloy product has a yield strength up to about 600 MPa (e.g., up to about 550 MPa). The clad product can have an elongation up to about 20% (e.g., up to about 15%).

Also provided are materials comprising the clad aluminum alloy products described herein. The materials can include automotive products (e.g., automotive structural parts), aerospace products (e.g., an aerospace structural part or an aerospace non-structural part), marine products (e.g., a marine structural part or a marine non-structural part), or electronic products (e.g., electronic device housings), among others. Further provided are aluminum sheets and plates comprising a clad aluminum alloy product as described herein.

Other objects and advantages will be apparent from the following detailed description of non-limiting examples.

DETAILED DESCRIPTION

Figure 1:
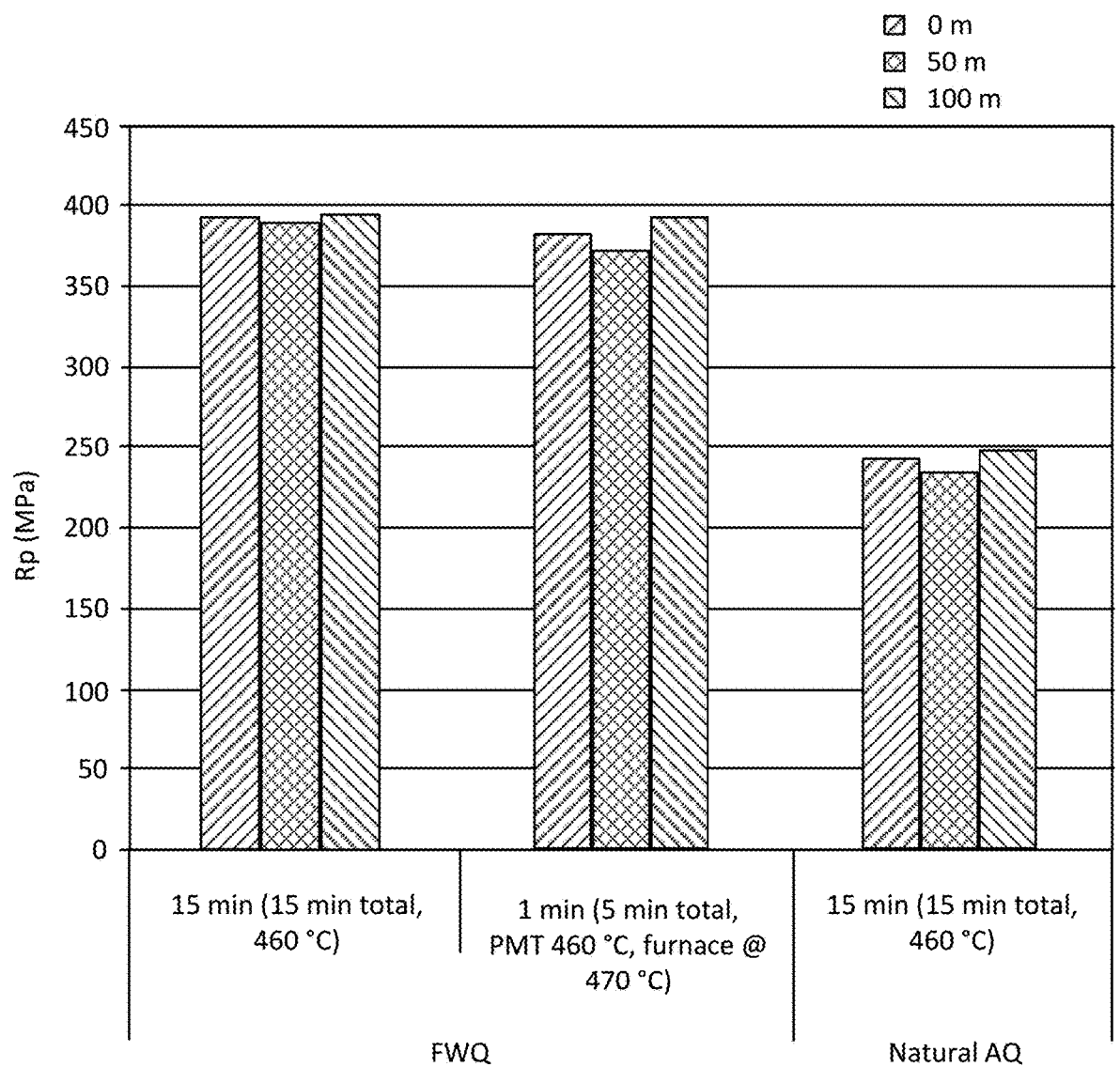
FIG. 1 is a graph of tensile strength of an exemplary alloy in a T6 temper condition after various solution heat treatment and quench techniques.

Described herein are new clad aluminum alloy products and methods of making these alloy products. The clad aluminum alloy products include a core layer and one or more cladding layers. For cladded aluminum alloy products, the core layer, which represents the largest component of the material, mainly determines the bulk mechanical properties of the cladded material (e.g., strength). On the other hand, the cladding layer(s), which represents a small component of the material, is in contact with the environment surrounding the cladded material and thus determines the chemical activity (e.g., corrosion resistance) and can affect the formability and joining properties of the cladded material.

The clad aluminum alloy products described herein possess a combination of strength and other key attributes, such as corrosion resistance, formability, and joining capabilities. Joining methods can include, but are not limited to, resistance spot welding (RSW), friction stir welding (FSW), remote laser welding, metal inert gas (MIG) welding, tungsten inert gas (TIG) welding, adhesive bonding, and self-piercing riveting.

Definitions and Descriptions

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness of greater than about 15 mm. For example, a plate may refer to an aluminum product having a thickness of greater than 15 mm, greater than 20 mm, greater than 25 mm, greater than 30 mm, greater than 35 mm, greater than 40 mm, greater than 45 mm, greater than 50 mm, or greater than 100 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. A T4 condition or temper refers to an aluminum alloy after solution heat treatment (i.e., solutionization) followed by natural aging. A T6 condition or temper refers to an aluminum alloy after solution heat treatment followed by artificial aging. A T8x condition or temper refers to an aluminum alloy solution heat treated, cold worked, and artificially aged.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, the meaning of "a," "an," and "the" includes singular and plural references unless the context clearly dictates otherwise.

In the following examples, the aluminum alloy products and their components are described in terms of their elemental composition in weight percent (wt. %). In each alloy, the remainder is aluminum, with a maximum wt. % of 0.15% for the sum of all impurities.

Clad Aluminum Alloy Products

Provided herein are new clad aluminum alloy products. The clad aluminum alloy products include a core layer of an aluminum alloy having a first side and a second side and one or more cladding layer(s) bonded to the first side or the second side of the core layer. In some examples, the core layer is clad on only one side (i.e., one cladding layer is present in the clad aluminum alloy product). In other examples, the core layer is clad on both sides (i.e., two cladding layers are present in the clad aluminum alloy product).

The first side of the core layer is adjacent to and contacts a first cladding layer to form a first interface. In other words, no layers intervene between the first cladding layer and the first side of the core layer. Optionally, the clad aluminum alloy product includes a second cladding layer. In these instances, the second side of the core layer is adjacent to and contacts a second cladding layer to form a second interface (i.e., no layers intervene between the second cladding layer and the second side of the core layer). The first cladding layer and the second cladding layer can be the same chemical composition or different chemical compositions.

Core Layer

The core layer is an aluminum-containing alloy. In some examples, the alloy for use as the core layer can have the following elemental composition as provided in Table 1.

TABLE 1

| Element | Weight Percentage (wt. %) |
|---|---|
| Zn | Up to 12.0 |
| Mg | 1.0-4.0 |
| Cu | 0.1-3.0 |
| Si | Up to 0.60 |
| Fe | Up to 0.50 |
| Mn | Up to 0.20 |
| Cr | Up to 0.20 |
| Zr | Up to 0.30 |
| Impurities | Up to 0.15 |
| Al | Remainder |

In some examples, the alloy for use as the core layer can have the following elemental composition as provided in Table 2.

TABLE 2

| Element | Weight Percentage (wt. %) |
|---|---|
| Zn | 5.0 to 9.5 |
| Mg | 1.2-2.3 |
| Cu | 0.1-2.6 |
| Si | Up to 0.10 |
| Fe | Up to 0.15 |
| Mn | Up to 0.05 |
| Cr | Up to 0.05 |
| Zr | Up to 0.25 |
| Impurities | Up to 0.15 |
| Al | Remainder |

In some examples, the alloy described herein for use as the core layer includes zinc (Zn) in an amount of up to about 12.0% (e.g., from about 0.5% to about 12.0%, from about 5.0% to about 12.0%, from about 5.0% to about 9.5%, or from about 5.0% to about 8.4%) based on the total weight of the alloy. For example, the alloy can include about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, about 7.0%, about 7.1%, about 7.2%, about 7.3%, about 7.4%, about 7.5%, about 7.6%, about 7.7%, about 7.8%, about 7.9%, about 8.0%, about 8.1%, about 8.2%, about 8.3%, about 8.4%, about 8.5%, about 8.6%, about 8.7%, about 8.8%, about 8.9%, about 9.0%, about 9.1%, about 9.2%, about 9.3%, about 9.4%, about 9.5 Zn, about 9.6%, about 9.7%, about 9.8%, about 9.9%, about 10.0%, about 10.1%, about 10.2%, about 10.3%, about 10.4%, about 10.5%, about 10.6%, about 10.7%, about 10.8%, about 10.9%, about 11.0%, about 11.1%, about 11.2%, about 11.3%, about 11.4%, about 11.5%, about 11.6%, about 11.7%, about 11.8%, about 11.9%, or about 12.0%. In some cases, Zn is not present in the alloy (i.e., 0%). All expressed in wt. %.

In some examples, the alloy described herein for use as the core layer also includes magnesium (Mg) in an amount of from about 1.0% to about 4.0% (e.g., from about 1.0% to about 3.7%, from about 1.1% to about 2.6%, from about 1.2% to about 2.3%, or from about 1.5% to about 2.0%) based on the total weight of the alloy. For example, the alloy can include about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, or about 4.0% Mg. All expressed in wt. %.

In some examples, the alloy described herein for use as the core layer also includes copper (Cu) in an amount of from about 0.1% to about 3.0% (e.g., from about 0.1% to about 2.6% or from about 0.15% to about 2.0%) based on the total weight of the alloy. For example, the alloy can include about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, or about 3.0% Cu. All expressed in wt. %.

In some examples, the alloy described herein for use as the core layer can also include silicon (Si) in an amount of up to about 0.6% (e.g., from 0% to about 0.4%, from about 0.05% to about 0.2%, or about 0.1%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, about 0.2%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, about 0.35%, about 0.36%, about 0.37%, about 0.38%, about 0.39%, about 0.4%, about 0.41%, about 0.42%, about 0.43%, about 0.44%, about 0.45%, about 0.46%, about 0.47%, about 0.48%, about 0.49%, about 0.5%, about 0.51%, about 0.52%, about 0.53%, about 0.54%, about 0.55%, about 0.56%, about 0.57%, about 0.58%, about 0.59%, or about 0.6% Si. In some cases, Si is not present in the alloy (i.e., 0%). All expressed in wt. %.

In some examples, the alloy described herein for use as the core layer can also include iron (Fe) in an amount of up to about 0.5% (e.g., from 0% to about 0.25% or from about 0.05% to about 0.15%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, about 0.35%, about 0.36%, about 0.37%, about 0.38%, about 0.39%, about 0.4%, about 0.41%, about 0.42%, about 0.43%, about 0.44%, about 0.45%, about 0.46%, about 0.47%, about 0.48%, about 0.49%, or about 0.5% Fe. In some cases, Fe is not present in the alloy (i.e., 0%). All expressed in wt. %.

In some examples, the alloy described herein for use as the core layer can also include manganese (Mn) in an amount of up to about 0.20% (e.g., from 0% to about 0.10%, from about 0.01% to about 0.05%, or from about 0.02% to about 0.10%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, or about 0.2% Mn. In some cases, Mn is not present in the alloy (i.e., 0%). All expressed in wt. %.

In some examples, the alloy described herein for use as the core layer can also include chromium (Cr) in an amount of up to about 0.20% (e.g., from 0% to about 0.10%, from about 0.01% to about 0.05%, or from about 0.02% to about 0.10%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, or about 0.2% Cr. In some cases, Cr is not present in the alloy (i.e., 0%). All expressed in wt. %.

In some examples, the alloy described herein for use as the core layer can also include zirconium (Zr) in an amount of up to about 0.30% (e.g., from 0% to about 0.25% or from about 0.05% to about 0.20%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30% Zr. In some cases, Zr is not present in the alloy (i.e., 0%). All expressed in wt. %.

Optionally, the alloy composition described herein for use as the core layer can further include other minor elements, sometimes referred to as impurities, in amounts of about 0.05% or below, about 0.04% or below, about 0.03% or below, about 0.02% or below, or about 0.01% or below each. These impurities may include, but are not limited to, V, Ni, Sn, Ga, Ca, Bi, Na, Pb, or combinations thereof. Accordingly, V, Ni, Sn, Ga, Ca, Bi, Na, or Pb may be present in alloys in amounts of about 0.05% or below, about 0.04% or below, about 0.03% or below, about 0.02% or below, or about 0.01% or below. The sum of all impurities does not exceed about 0.15% (e.g., about 0.10%). All expressed in wt. %. The remaining percentage of the alloy is aluminum.

In some examples, any alloy designated as an "AA7xxx series" alloy is suitable for use as the core layer. By way of non-limiting example, the AA7xxx series alloys suitable for use as the core layer can include AA7021, AA7075, AA7055, AA7085, AA7011, AA7019, AA7020, AA7039, AA7072, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7204, AA7249, AA7349, AA7449, AA7050, AA7050A, AA7150, AA7250, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

The thickness of the core layer can be from about 50% to about 99% of the clad aluminum alloy products described herein. For example, in a clad aluminum alloy product having a thickness of about 1000 microns, the core layer can have a thickness of about 500 microns to about 990 microns. Optionally, the core layer can have a thickness in the range of about 0.5 mm to about 3 mm (e.g., from about 0.7 mm to about 2.3 mm). For example, the thickness of the core layer can be about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, or about 3.0 mm.

Cladding Layer(s)

Also described herein is an aluminum-containing alloy for use as the cladding layer(s) in the clad aluminum alloy products. In some examples, any alloy designated as an "AA1xxx series" alloy, an "AA2xxx series" alloy, an "AA3xxx series" alloy, an "AA4xxx series" alloy, an "AA5xxx series" alloy, an "AA6xxx series" alloy, or an "AA7xxx series" alloy is suitable for use as the cladding layer.

By way of non-limiting example, exemplary AA1xxx series alloys for use as the cladding layer can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, and AA1199.

Non-limiting exemplary AA2xxx series alloys for use as the cladding layer can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Optionally, in some examples, AA2xxx series alloys for use as the cladding layer can include sufficient amounts of Si and Mg to provide a high content of magnesium silicide ($Mg_2Si$) precipitates during processing. As used herein, a high $Mg_2Si$ precipitate content refers to a $Mg_2Si$ precipitate content of from about 0.5% to about 1.5% (e.g., from about 0.75% to about 1.4% or from about 0.9% to about 1.2%). For example, the $Mg_2Si$ precipitate content can be about 0.5%, 0.55%, 0.6%, 0.65%, 0.7%, 0.75%, 0.8%, 0.85%, 0.9%, 0.95%, 1.0%, 1.05%, 1.1%, 1.15%, 1.2%, 1.25%, 1.3%, 1.35%, 1.4%, 1.45%, or 1.5%.

Non-limiting exemplary AA3xxx series alloys for use as the cladding layer can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Non-limiting exemplary AA4xxx series alloys for use as the cladding layer can include AA4045, AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4145, AA4145A, AA4046, AA4047, AA4047A, and AA4147.

Non-limiting exemplary AA5xxx series alloys for use as the cladding layer can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Non-limiting exemplary AA6xxx series alloys for use as the cladding layer can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Non-limiting exemplary AA7xxx series alloys for use as the cladding layer can include AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

Clad layers as described herein can improve surface corrosion resistance properties of the products, improve pretreatment efficiency, aid bending, riveting hole piercing and clinching, and can make the alloy product usable in T4 temper for some parts without hot forming. Moreover, when a filler wire alloy, such as AA5182 or AA7021, is used as the clad layer, laser welding can be accomplished without using filler wire.

In some examples, an alloy for use as the cladding layer can have the following elemental composition as provided in Table 3.

TABLE 3

| Element | Weight Percentage (wt. %) |
|---|---|
| Zn | Up to 7.0 |
| Mg | Up to 6.0 |
| Cu | Up to 0.35 |
| Si | 0.05-13.5 |
| Fe | 0.10-0.90 |
| Mn | Up to 1.5 |
| Cr | Up to 0.35 |
| Zr | Up to 0.30 |
| Impurities | Up to 0.15 |
| Al | Remainder |

In some examples, the alloy for use as the cladding layer can have the following elemental composition as provided in Table 4.

TABLE 4

| Element | Weight Percentage (wt. %) |
|---|---|
| Zn | Up to 6.0 |
| Mg | 0.1-3.5 |
| Cu | Up to 0.3 |
| Si | 0.05-0.40 |
| Fe | 0.20-0.40 |
| Mn | 0.10-0.80 |
| Cr | Up to 0.30 |
| Zr | Up to 0.25 |
| Impurities | Up to 0.15 |
| Al | Remainder |

In some examples, the alloy for use as the cladding layer can have the following elemental composition as provided in Table 5.

TABLE 5

| Element | Weight Percentage (wt. %) |
|---|---|
| Zn | Up to 1.3 |
| Mg | 0.05-2.0 |
| Cu | Up to 0.35 |
| Si | 0.6-13.5 |
| Fe | 0.10-0.80 |
| Mn | Up to 0.80 |
| Cr | Up to 0.35 |
| Zr | Up to 0.30 |
| Impurities | Up to 0.15 |
| Al | Remainder |

In some examples, the alloy for use as the cladding layer can have the following elemental composition as provided in Table 6.

TABLE 6

| Element | Weight Percentage (wt. %) |
|---|---|
| Zn | Up to 0.5 |
| Mg | 4.0-4.8 |
| Cu | Up to 0.1 |
| Si | 0.05-0.20 |
| Fe | 0.20-0.40 |
| Mn | 0.10-0.80 |
| Cr | Up to 0.20 |
| Zr | Up to 0.25 |
| Impurities | Up to 0.15 |
| Al | Remainder |

In some examples, the alloy described herein for use as the cladding layer includes zinc (Zn) in an amount of up to about 7.0% (e.g., up to about 1.0%, from about 3.5% to about 6.0%, from about 4.0% to about 5.5%, from about 0.05% to about 0.25%, or from about 0.10% to about 0.45%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, or about 7.0% Zn. In some cases, Zn is not present in the alloy (i.e., 0%). All expressed in wt. %.

In some examples, the alloy described herein for use as the cladding layer also includes magnesium (Mg) in an amount of up to about 6.0% (e.g., from about 0.2% to about 5.7%, from about 1.2% to about 3.3%, from about 1.5% to about 2.5%, or from about 4.0% to about 4.8%) based on the total weight of the alloy. For example, the alloy can include about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, or about 6.0% Mg. All expressed in wt. %.

In some examples, the alloy described herein for use as the cladding layer can also include copper (Cu) in an amount of up to about 0.35% (e.g., from 0% to about 0.30% or from about 0.1% to about 0.25%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, or about 0.35% Cu. In some cases, Cu is not present in the alloy (i.e., 0%). All expressed in wt. %.

In some examples, the alloy described herein for use as the cladding layer also includes silicon (Si) in an amount of from about 0.05% to about 13.5% (e.g., from about 0.1% to about 13.0, from about 0.5% to about 12.5%, from about 1% to about 10%, from about 2% to about 8%, from about 4% to about 7%, from about 0.05% to about 0.40%, from about 0.6% to about 13.5%, from about 0.10% to about 0.35% or from about 0.15% to about 0.30%) based on the total weight of the alloy. For example, the alloy can include about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, about 7.0%, about 7.1%, about 7.2%, about 7.3%, about 7.4%, about 7.5%, about 7.6%, about 7.7%, about 7.8%, about 7.9%, about 8.0%, about 8.1%, about 8.2%, about 8.3%, about 8.4%, about 8.5%, about 8.6%, about 8.7%, about 8.8%, about 8.9%, about 9.0%, about 9.1%, about 9.2%, about 9.3%, about 9.4%, about 9.5%, about 9.6%, about 9.7%, about 9.8%, about 9.9%, about 10.0%, about 10.1%, about 10.2%, about 10.3%, about 10.4%, about 10.5%, about 10.6%, about 10.7%, about 10.8%, about 10.9%, about 11.0%, about 11.1%, about 11.2%, about 11.3%, about 11.4%, about 11.5%, about 11.6%, about 11.7%, about 11.8%, about 11.9%, about 12.0%, about 12.1%, about 12.2%, about 12.3%, about 12.4%, about 12.5%, about 12.6%, about 12.7%, about 12.8%, about 12.9%, about 13.0%, about 13.1%, about 13.2%, about 13.3%, about 13.4%, or about 13.5%. All expressed in wt. %.

In some examples, the alloy described herein for use as the cladding layer also includes iron (Fe) in an amount of from about 0.10% to about 0.90% (e.g., from about 0.20% to about 0.60%, from about 0.20% to about 0.40%, or from about 0.25% to about 0.35%) based on the total weight of the alloy. For example, the alloy can include about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, or about 0.90% Fe. All expressed in wt. %.

In some examples, the alloy described herein for use as the cladding layer can also include manganese (Mn) in an amount of up to about 1.5% (e.g., from about 0.1% to about 0.8%, from about 0.15% to about 0.55%, or from about 0.2% to about 0.35%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, or about 1.5% Mn. In some cases, Mn is not present in the alloy (i.e., 0%). All expressed in wt. %.

In some examples, the alloy described herein for use as the cladding layer can also include chromium (Cr) in an amount of up to about 0.35% (e.g., from 0% to about 0.25% or from about 0.01% to about 0.15%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, or about 0.35% Cr. In some cases, Cr is not present in the alloy (i.e., 0%). All expressed in wt. %.

In some examples, the alloy described herein for use as the cladding layer can also include zirconium (Zr) in an amount of up to about 0.30% (e.g., from 0% to about 0.20% or from about 0.05% to about 0.15%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30% Zr. In some cases, Zr is not present in the alloy (i.e., 0%). All expressed in wt. %.

Optionally, the alloy described herein can further include other minor elements, sometimes referred to as impurities, in amounts of about 0.05% or below, about 0.04% or below, about 0.03% or below, about 0.02% or below, or about 0.01% or below each. These impurities may include, but are not limited to, V, Ni, Sn, Ga, Ca, Bi, Na, Pb, or combinations thereof. Accordingly, V, Ni, Sn, Ga, Ca, Bi, Na, or Pb may be present in alloys in amounts of about 0.05% or below, about 0.04% or below, about 0.03% or below, about 0.02% or below, or about 0.01% or below. The sum of all impurities does not exceed about 0.15% (e.g., about 0.10%). All expressed in wt. %. The remaining percentage of the alloy is aluminum.

The thickness of each cladding layer can be from about 1% to about 25% of the total thickness of the clad aluminum alloy products described herein (e.g., from about 1% to about 12%, or about 10%). For example, in an aluminum alloy product having a thickness of 1000 microns, each cladding layer can have a thickness of about 10 microns to about 250 microns. Optionally, each cladding layer can have a thickness in the range of about 0.20 mm to about 0.80 mm.

As described above, the clad aluminum alloy products can contain one cladding layer or more than one cladding layer. In some cases, the clad aluminum alloy products contain only a first cladding layer. In some cases, the clad aluminum alloy products contain a first cladding layer and a second cladding layer. In some cases, the first cladding layer and the second cladding layer are identical in composition. In other cases, the first cladding layer and the second cladding layer differ in composition. The resulting clad aluminum alloy products exhibit excellent balanced properties, such as strength, formability, corrosion resistance, dent resistance, and hemming performance.

Methods of Producing the Alloys and Clad Aluminum Alloy Products

The alloys described herein for use as the core and cladding layers can be cast using any suitable casting method. As a few non-limiting examples, the casting process can include a direct chill (DC) casting process or a continuous casting (CC) process.

A clad layer as described herein can be attached to a core layer as described herein to form a cladded product by any means known to persons of ordinary skill in the art. For example, a clad layer can be attached to a core layer by direct chill co-casting (i.e., fusion casting) as described in, for example, U.S. Pat. Nos. 7,748,434 and 8,927,113, both of which are hereby incorporated by reference in their entireties; by hot and cold rolling a composite cast ingot as described in U.S. Pat. No. 7,472,740, which is hereby incorporated by reference in its entirety; or by roll bonding to achieve the required metallurgical bonding between the core and the cladding; or by other methods as known to persons of ordinary skill in the art. The initial dimensions and final dimensions of the clad aluminum alloy products described herein can be determined by the desired properties of the overall final product.

The roll bonding process can be carried out in different manners, as known to those of ordinary skill in the art. For example, the roll-bonding process can include both hot rolling and cold rolling. Further, the roll bonding process can be a one-step process or a multi-step process in which the material is gauged down during successive rolling steps. Separate rolling steps can optionally be separated by other processing steps, including, for example, annealing steps, cleaning steps, heating steps, cooling steps, and the like.

The co-cast ingot or other cast product can be processed by any means known to those of ordinary skill in the art. Optionally, the processing steps can be used to prepare sheets. Such processing steps include, but are not limited to, homogenization, hot rolling, cold rolling, solution heat treatment, and an optional pre-aging step, as known to those of ordinary skill in the art.

In the homogenization step of a DC casting process, the co-cast ingot described herein is heated to a temperature ranging from about 400° C. to about 500° C. For example, the ingot can be heated to a temperature of about 400° C., about 410° C., about 420° C., about 430° C., about 440° C., about 450° C., about 460° C., about 470° C., about 480° C., about 490° C., or about 500° C. The ingot is then allowed to soak (i.e., held at the indicated temperature) for a period of time. In some examples, the total time for the homogenization step, including the heating and soaking phases, can be up to 24 hours. For example, the ingot can be heated up to 500° C. and soaked, for a total time of up to 18 hours for the homogenization step. Optionally, the ingot can be heated to below 490° C. and soaked, for a total time of greater than 18 hours for the homogenization step. In some cases, the homogenization step comprises multiple processes. In some non-limiting examples, the homogenization step includes heating the ingot to a first temperature for a first period of time followed by heating to a second temperature for a second period of time. For example, the ingot can be heated to about 465° C. for about 3.5 hours and then heated to about 480° C. for about 6 hours.

Following the homogenization step of the co-cast ingot, a hot rolling step can be performed. Prior to the start of hot rolling, the homogenized ingot can be allowed to cool to a temperature of from about 300° C. to about 450° C. For example, the homogenized ingot can be allowed to cool to a temperature of from about 325° C. to about 425° C. or from about 350° C. to about 400° C. The ingots can then be hot rolled at a temperature between 300° C. to 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between). Optionally, the cast product can be a continuously cast product that can be allowed to cool to a temperature of from about 300° C. to about 450° C. For example, the continuously cast product can be allowed to cool to a temperature of from about 325° C. to about 425° C. or from about 350° C. to about 400° C. The continuously cast product can then be hot rolled at a temperature of from about 300° C. to about 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between). During hot rolling, temperatures and other operating parameters can be controlled so that the temperature of the clad alloy hot rolled product upon exit from the hot rolling mill is no more than about 470° C., no more than about 450° C., no more than about 440° C., or no more than about 430° C.

The clad plate, shate, or sheet can then be cold rolled using conventional cold rolling mills and technology. The cold rolled clad sheet can have a gauge of from about 0.5 mm to about 10 mm, e.g., between about 0.7 mm to about 6.5 mm. Optionally, the cold rolled clad sheet can have a gauge of 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm. The cold rolling can be performed to result in a final gauge thickness that represents a gauge reduction of up to about 85% (e.g., up to about 10%, up to about 20%, up to about 30%, up to about 40%, up to about 50%, up to about 60%, up to about 70%, up to about 80%, or up to about 85% reduction). Optionally, an interannealing step can be performed during the cold rolling step. The interannealing step can be performed at a temperature of from about 300° C. to about 450° C. (e.g., about 310° C., about 320° C., about 330° C., about 340° C., about 350° C., about 360° C., about 370° C., about 380° C., about 390° C., about 400° C., about 410° C., about 420° C., about 430° C., about 440° C., or about 450° C.). In some cases, the interannealing step comprises multiple processes. In some non-limiting examples, the interannealing step includes heating the clad plate, shate, or sheet to a first temperature for a first period of time followed by heating to a second temperature for a second period of time. For example, the clad plate, shate, or sheet can be heated to about 410° C. for about 1 hour and then heated to about 330° C. for about 2 hours.

Subsequently, the clad plate, shate, or sheet can undergo a solution heat treatment step. The solution heat treatment step can include any conventional treatment for the clad sheet which results in solutionizing of the soluble particles. The clad plate, shate, or sheet can be heated to a peak metal temperature (PMT) of up to about 590° C. (e.g., from about 400° C. to about 590° C.) and soaked for a period of time at the temperature. For example, the clad plate, shate or sheet can be soaked at about 480° C. for a soak time of up to about 30 minutes (e.g., 0 seconds, about 60 seconds, about 75 seconds, about 90 seconds, about 5 minutes, about 10 minutes, about 20 minutes, about 25 minutes, or about 30 minutes). After heating and soaking, the clad plate, shate, or sheet is rapidly cooled at rates greater than 50° C./second (° C./s) to a temperature from about 500° C. to about 200° C. In one example, the clad plate, shate or sheet has a quench rate of above 200° C./s at temperatures from about 450° C. to about 200° C. Optionally, the cooling rates can be faster in other cases.

After quenching, the clad plate, shate or sheet can optionally undergo a pre-aging treatment by reheating the plate, shate, or sheet before coiling. The pre-aging treatment can be performed at a temperature of from about 50° C. to about 150° C. for a period of time of up to about 6 hours. For example, the pre-aging treatment can be performed at a temperature of about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C. Optionally, the pre-aging treatment can be performed for about 30 minutes, about 1 hour, about 2 hours, about 3 hours, about 4 hours, about 5 hours, or about 6 hours. The pre-aging treatment can be carried out by passing the plate, shate, or sheet through a heating device, such as a device that emits radiant heat, convective heat, induction heat, infrared heat, or the like.

The co-cast ingots or other co-cast products described herein can also be used to make products in the form of plates or other suitable products. The products can be made using techniques as known to those of ordinary skill in the art. For example, plates including the clad products as described herein can be prepared by processing a co-cast ingot in a homogenization step or casting a co-cast product in a continuous caster followed by a hot rolling step. In the hot rolling step, the cast product can be hot rolled to a 200 mm thick gauge or less (e.g., from about 10 mm to about 200 mm). For example, the cast product can be hot rolled to a plate having a final gauge thickness of about 10 mm to about 175 mm, about 15 mm to about 150 mm, about 20 mm to about 125 mm, about 25 mm to about 100 mm, about 30 mm to about 75 mm, or about 35 mm to about 50 mm.

Properties of Clad Aluminum Alloy Products

The clad aluminum alloy products described herein can be designed to achieve any desired strength level as determined by persons of ordinary skill in the art. For example, the clad aluminum alloy products described herein can have yield strengths of up to about 600 MPa (e.g., from about 400 MPa to about 600 MPa, from about 450 MPa to about 600 MPa, or from about 500 MPa to about 600 MPa). In some examples, the yield strengths of the products can be about 400 MPa, about 425 MPa, about 450 MPa, about 475 MPa, about 500 MPa, about 525 MPa, about 550 MPa, about 575 MPa, or about 600 MPa.

In addition, the clad aluminum alloy products described herein can have elongations of up to about 20%. For example, the elongations can be about 10%, about 11%, about 12%, about 13%, about 14%, about 15%, about 16%, about 17%, about 18%, about 19%, or about 20%.

Further, the clad aluminum alloy products described herein can have strong bendability properties. A bend angle of from about 45° to about 120° can be achieved, based on the desired use of the product, as measured by a three-point bend test according to VDA Standard 238-100, normalized to 2.0 mm. For example, the clad aluminum products described herein can achieve a bend angle of about 45°, about 50°, about 55°, about 60°, about 65°, about 70°, about 75°, about 80°, about 85°, about 90°, about 95°, about 100°, about 105°, about 110°, about 115°, or about 120°.

In some examples, a clad aluminum alloy sheet made according to a method described herein can have a minimum R/t ratio (i.e., f-factor) of about 1.2 without cracking. The R/t ratio can provide an assessment of the bendability of a material. As described below, the bendability is assessed based on the R/t ratio, where R is the radius of the tool (die) used and t is the thickness of the material. A lower R/t ratio indicates better bendability of the material. The R/t ratio of the aluminum alloys described herein can be about 1.1 or lower (e.g., about 1.0 or lower, about 0.9 or lower, about 0.8 or lower, or about 0.7 or lower).

Methods of Using the Clad Aluminum Alloy Products

The clad aluminum alloy products described herein can be used in automotive applications and other transportation applications, including aircraft and railway applications. For example, the clad aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The clad aluminum alloy products and methods described herein can also be used in aircraft or railway vehicle applications, to prepare, for example, external and internal panels. In some examples, the clad aluminum alloy products can be used in aerospace structural and non-structural parts or in marine structural or non-structural parts.

The clad aluminum alloy products and methods described herein can also be used in electronics applications. For example, the clad aluminum alloy products and methods described herein can be used to prepare housings for electronic devices, including mobile phones and tablet computers. In some examples, the clad aluminum alloy products can be used to prepare housings for the outer casings of mobile phones (e.g., smart phones) and tablet bottom chassis.

The clad aluminum alloy products and methods described herein can also be used in other applications as desired. The clad aluminum alloy products described herein can be provided as clad aluminum alloy sheets and/or clad aluminum alloy plates suitable for further processing by an end user. For example, a clad aluminum alloy sheet can be further subjected to surface treatments by an end user for use as an architectural skin panel for aesthetic and structural purposes.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

EXAMPLE 1

Clad Aluminum Alloy

Clad aluminum alloy products were produced by preparing a co-cast ingot including an AA7xxx series core that was clad on both sides, homogenizing at 465° C. for 3.5 hours and then 480° C. for 6 hours, and hot rolling to a thickness of 10.5 mm at a temperature between 300° C. and 350° C. The hot rolled sheets were then cold rolled to a thickness of 2.0 mm and subsequently solution heat treated at a peak metal temperature (PMT) ranging from 425° C. to 550° C. for 15 minutes.

As shown in Table 7, Alloys 1, 2, and 3, which are 7xxx series alloys, were used as the core alloys to produce the samples of Table 8. Alloys 4, 5, 6, 7, 8, and 9 were used as the cladding layers to produce the samples of Table 8.

TABLE 7

| Element | Core | | | Cladding | | | | | |
| --- | --- | --- | --- | --- | --- | --- | --- | --- | --- |
| | Alloy 1 | Alloy 2 | Alloy 3 | Alloy 4 | Alloy 5 | Alloy 6 | Alloy 7 | Alloy 8 | Alloy 9 |
| Si | 0.10 | 0.09 | 0.10 | 0.10 | 0.09 | 0.10 | 10.0 | 0.1 | 0.1 |
| Fe | 0.15 | 0.16 | 0.20 | 0.20 | 0.20 | 0.20 | 0.80 | 0.15 | 0.48 |
| Cu | 0.15 | 1.34 | 0.30 | — | 0.02 | 0.10 | 0.30 | 0.0 | 0.02 |
| Mn | 0.05 | 0.048 | 0.0 | 0.75 | 0.23 | 0.10 | 0.05 | 0.15 | 0.19 |
| Mg | 1.50 | 2.52 | 2.3 | 4.75 | 4.15 | 0.10 | 0.05 | 1.60 | 0.1 |
| Cr | — | 0.02 | 0.04 | 0.15 | — | — | — | — | — |
| Ti | 0.02 | 0.02 | 0.02 | 0.02 | 0.014 | 0.02 | 0.20 | — | — |
| Zn | 5.35 | 5.72 | 9.2 | — | — | 1.0 | 0.10 | 5.6 | 0.02 |
| Zr | 0.10 | 0.1 | 0.10 | — | — | — | — | — | — |

All expressed in wt. %. Up to 0.15 wt. % impurities. Remainder is Al.

Sample products were prepared by combining the core layers and the cladding layers of Table 7, as shown in Table 8.

TABLE 8

| Sample | Core Layer | Cladding Layer | Number of Cladding Layers | Cladding Layer Thickness |
| --- | --- | --- | --- | --- |
| A | Alloy 2 | Alloy 5 | 2 | Each layer is 12% of the total thickness of the clad product |
| B | Alloy 1 | Alloy 4 | 2 | Each layer is 12% of the total thickness of the clad product |
| C | Alloy 1 | Alloy 6 | 2 | Each layer is 12% of the total thickness of the clad product |
| D | Alloy 1 | Alloy 7 | 2 | Each layer is 12% of the total thickness of the clad product |
| E | Alloy 2 | Alloy 4 | 2 | Each layer is 12% of the total thickness of the clad product |
| F | Alloy 2 | Alloy 6 | 2 | Each layer is 12% of the total thickness of the clad product |
| G | Alloy 2 | Alloy 7 | 2 | Each layer is 12% of the total thickness of the clad product |

EXAMPLE 2

Clad aluminum alloy products were prepared according to the method described in Example 1. As shown in Table 9, Alloys 10 and 11 are 7xxx series aluminum alloys that were used as the core alloys to produce the samples of Table 10. Alloys 12 and 13 were used as the cladding layers to produce the samples of Table 10.

TABLE 9

| Element | Core | | Cladding | |
| --- | --- | --- | --- | --- |
| | Alloy 10 | Alloy 11 | Alloy 12 | Alloy 13 |
| Si | 0.10 | 0.06 | 0.25 | 0.30 |
| Fe | 0.15 | 0.08 | 0.40 | 0.40 |
| Cu | 2.0-2.6 | 1.3-2.0 | 0.25 | 0.10 |
| Mn | 0.05 | 0.04 | 0.10 | 0.10-0.40 |
| Mg | 1.8-2.3 | 1.2-1.8 | 1.2-1.8 | 2.30-3.30 |
| Cr | 0.04 | 0.04 | 0.05 | 0.15-0.25 |
| Zn | 7.6-8.4 | 7.0-8.0 | 5.0-6.0 | 3.5-4.5 |
| Zr | 0.08-0.25 | 0.05-0.25 | 0.08-0.18 | — |

All expressed in wt. %. Up to 0.15 wt. % impurities. Remainder is Al.

Sample products were prepared by combining the core layers and the cladding layers as shown in Table 10.

TABLE 10

| Sample | Core Layer | Cladding Layer | Number of Cladding Layers | Cladding Layer Thickness |
| --- | --- | --- | --- | --- |
| H | Alloy 10 | Alloy 12 | 2 | Each layer is 12% of the total thickness of the clad product |
| I | Alloy 10 | Alloy 13 | 2 | Each layer is 12% of the total thickness of the clad product |
| J | Alloy 11 | Alloy 12 | 2 | Each layer is 12% of the total thickness of the clad product |
| K | Alloy 11 | Alloy 13 | 2 | Each layer is 12% of the total thickness of the clad product |

EXAMPLE 3

Clad Aluminum Alloy Strength Properties

Sample A clad aluminum alloys (Table 8) were produced according to methods described herein. Test samples were taken from a cold rolled clad aluminum alloy sheet at distances of 0 meters (m), 50 m, and 100 m from the leading edge of the cold rolled clad aluminum alloy sheet. Yield and tensile strength tests were performed according to ASTM B557. FIG. 1 shows the yield strength (Rp) of an exemplary alloy in a T6 temper solutionized via a batch-type procedure and quenched by a full water quench (referred to as "FWQ") procedure (left and center set of histograms). The exemplary alloy in T6 temper was also quenched by natural cooling in air (referred to as "Natural AQ" in FIG. 1) (right set of histograms). Solutionizing parameters are listed below each sample set of histograms.

Figure 2:
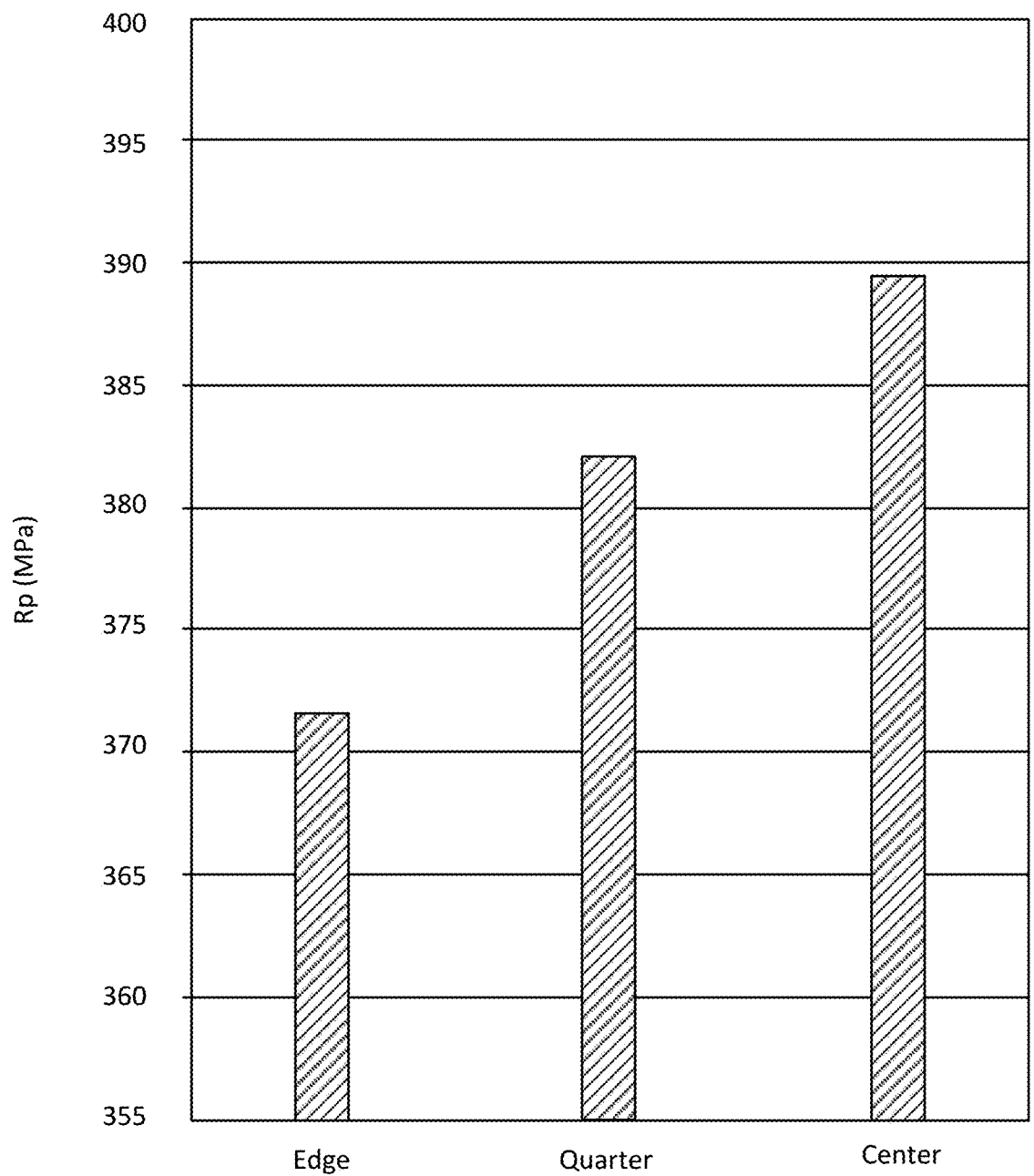
FIG. 2 is a graph showing the tensile strength of an exemplary alloy in a T6 temper. Samples were taken from various lateral positions from the aluminum sheet.

FIG. 2 shows yield strength (Rp) as a function of position across a width of the aluminum alloy sheet in T6 temper. The aluminum alloy sheet was solutionized at a temperature of 450° C. and allowed to soak for 10 minutes at 450° C. and quenched with water. Yield strength test samples were taken from the outer edge (left histogram, referred to as "edge"), center (right histogram, referred to as "center") and a midpoint between the edge and center (center histogram, referred to as "quarter"). A higher yield strength was observed at the center across the width of the sheet.

Figure 3:
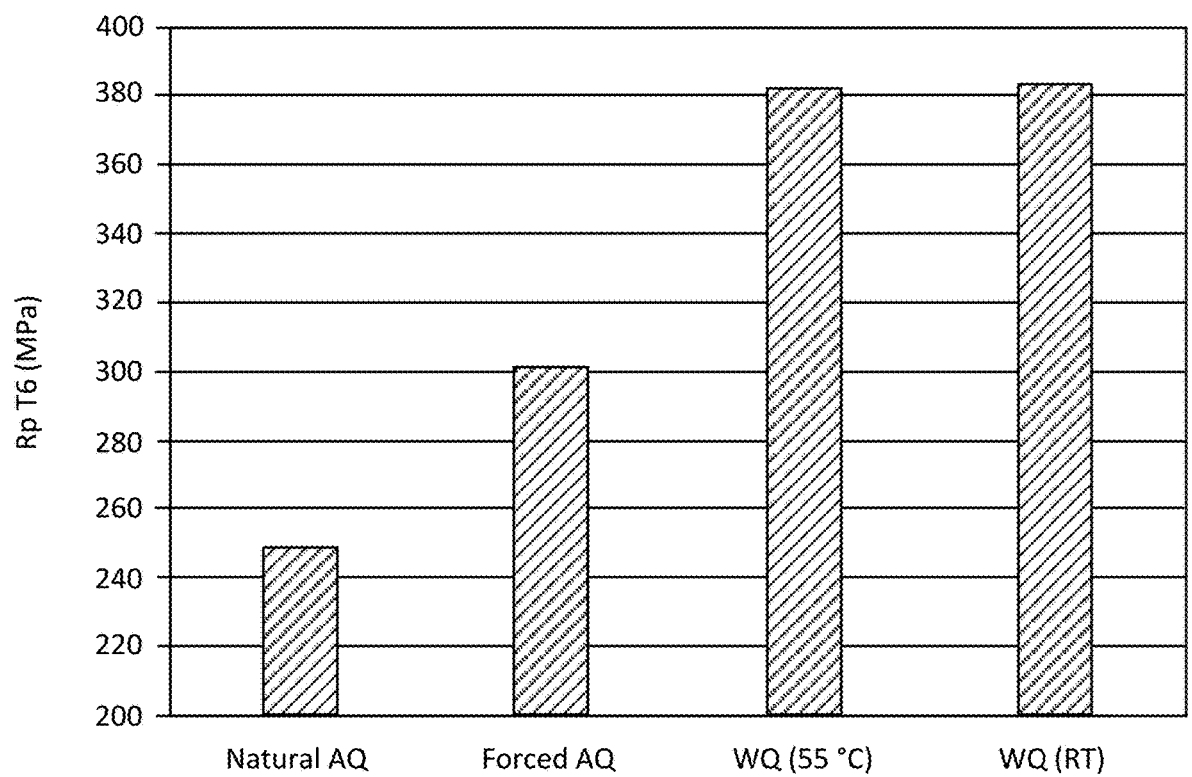
FIG. 3 is a graph showing the tensile strength of an exemplary alloy of 2 mm gauge in a T6 temper after various quench techniques (e.g., a natural air quench (referred to as "AQ"), a forced AQ, a warm water quench (referred to as "WQ", water temperature of about 55° C.), and a room temperature (referred to as "RT") water quench).

FIG. 3 presents the effects of quenching on yield strength (Rp) of exemplary aluminum alloys cold rolled to a 2 mm gauge. Aluminum alloy sheets were solutionized and quenched via a natural air quench (AQ) (left histogram), a forced air quench (second from left histogram), a warm water quench (WQ) (water temperature 55° C., third from left histogram) and a room temperature (RT) (e.g., between about 20° C. and 25° C.) water quench (WQ) (right histogram). The sheets were in T6 temper.

Figure 4:
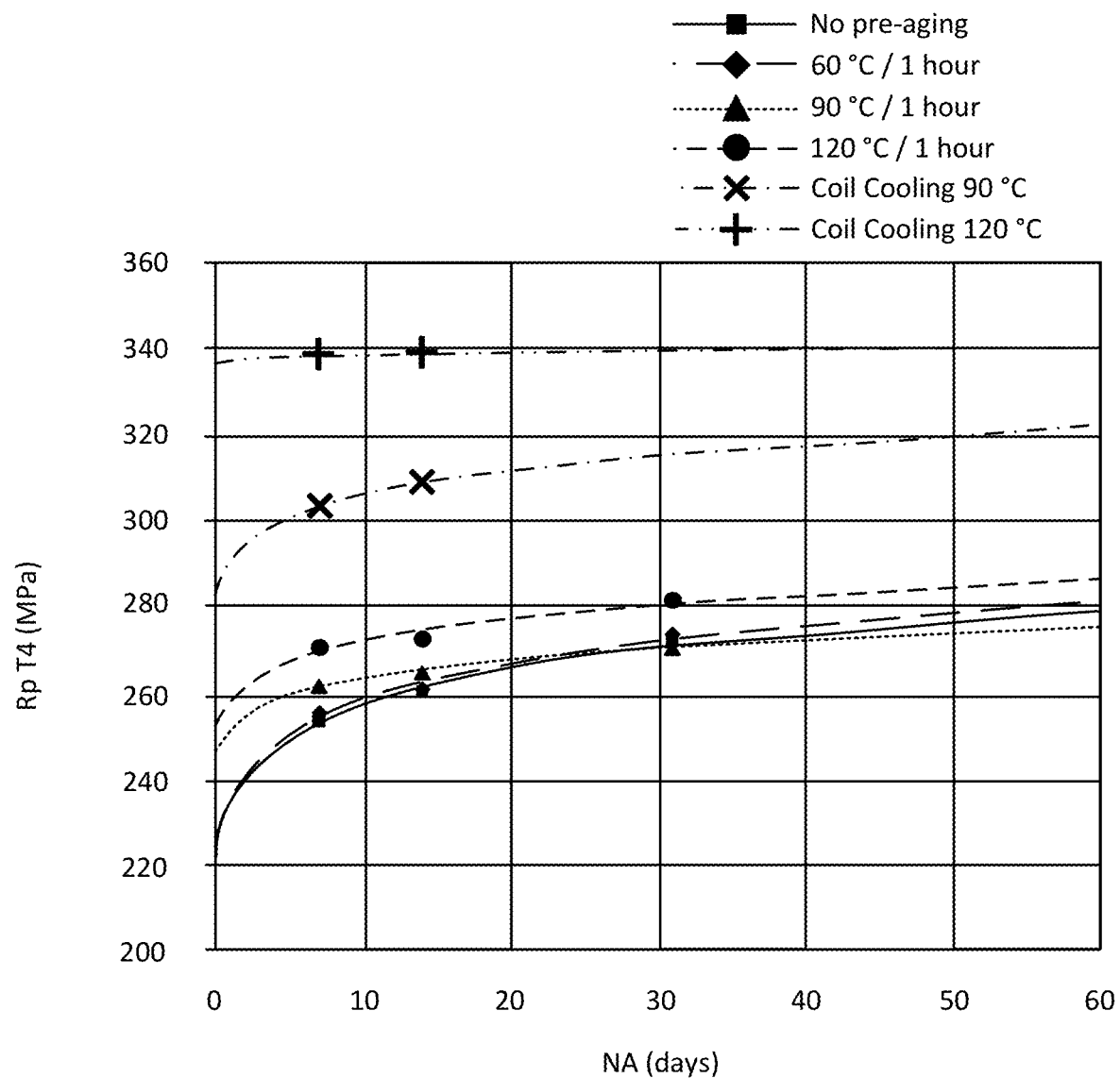
FIG. 4 is a graph showing an effect of pre-aging on natural age hardening (referred to as "NA") over time of an exemplary alloy.
Figure 5:
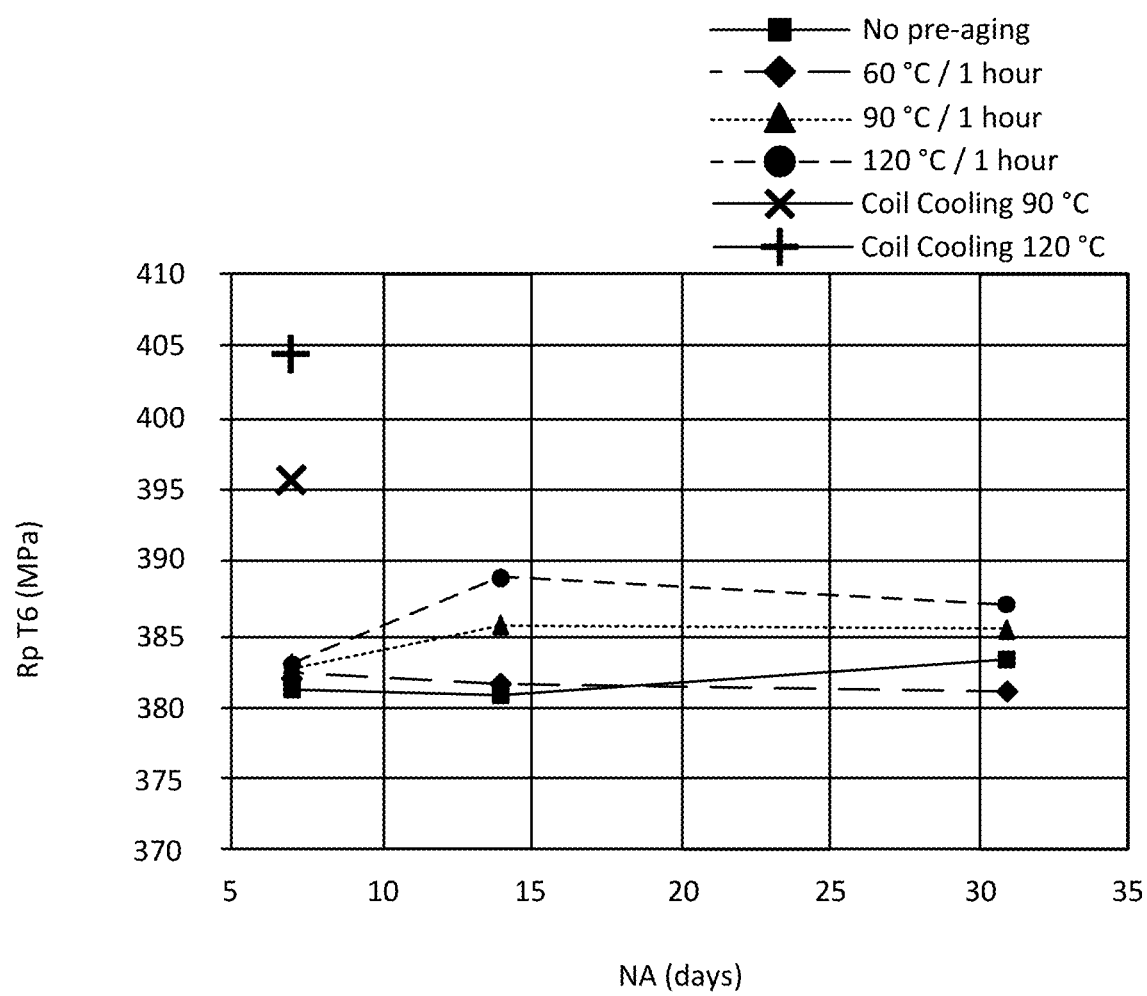
FIG. 5 is a graph showing an effect of pre-aging and natural aging on an exemplary alloy in a T6 temper.

FIGS. 4 and 5 show the effects of a pre-aging heat treatment (sometimes referred to as "PX") on natural age (NA) hardening of exemplary aluminum alloy sheets in T4 temper (FIG. 4) and T6 temper (FIG. 5). Pre-aging was performed by heating the samples to temperatures of 60° C. (indicated by diamonds in FIGS. 4 and 5), 90° C. (indicated by triangles in FIGS. 4 and 5), or 120° C. (indicated by circles in FIGS. 4 and 5) and maintaining the temperature for 1 hour. Pre-aging was also performed by heating aluminum alloy sheet coils to 90° C. and allowing them to cool in air (indicated by X in FIGS. 4 and 5) or by heating aluminum alloy sheet coils to 120° C. and allowing them to cool in air to simulate natural air cooling of a production coil (indicated by + in FIGS. 4 and 5). Additionally, a control sample not subjected to pre-aging (indicated by squares in FIGS. 4 and 5) was tested. Pre-aging stabilizes the natural age hardening of the exemplary alloy.

Figure 6:
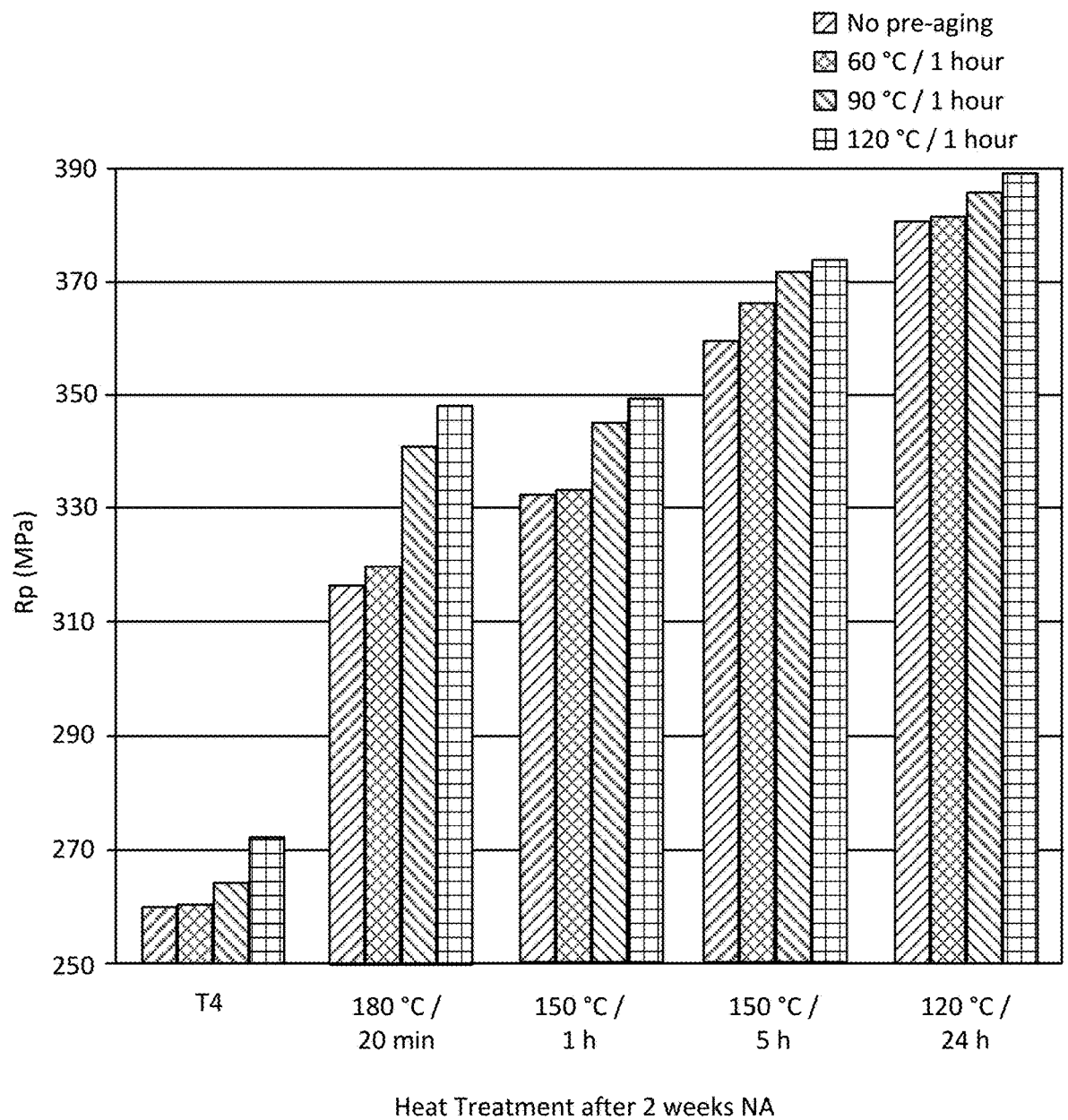
FIG. 6 is a graph showing the yield strengths of exemplary alloys after various heat treatments.
Figure 7:
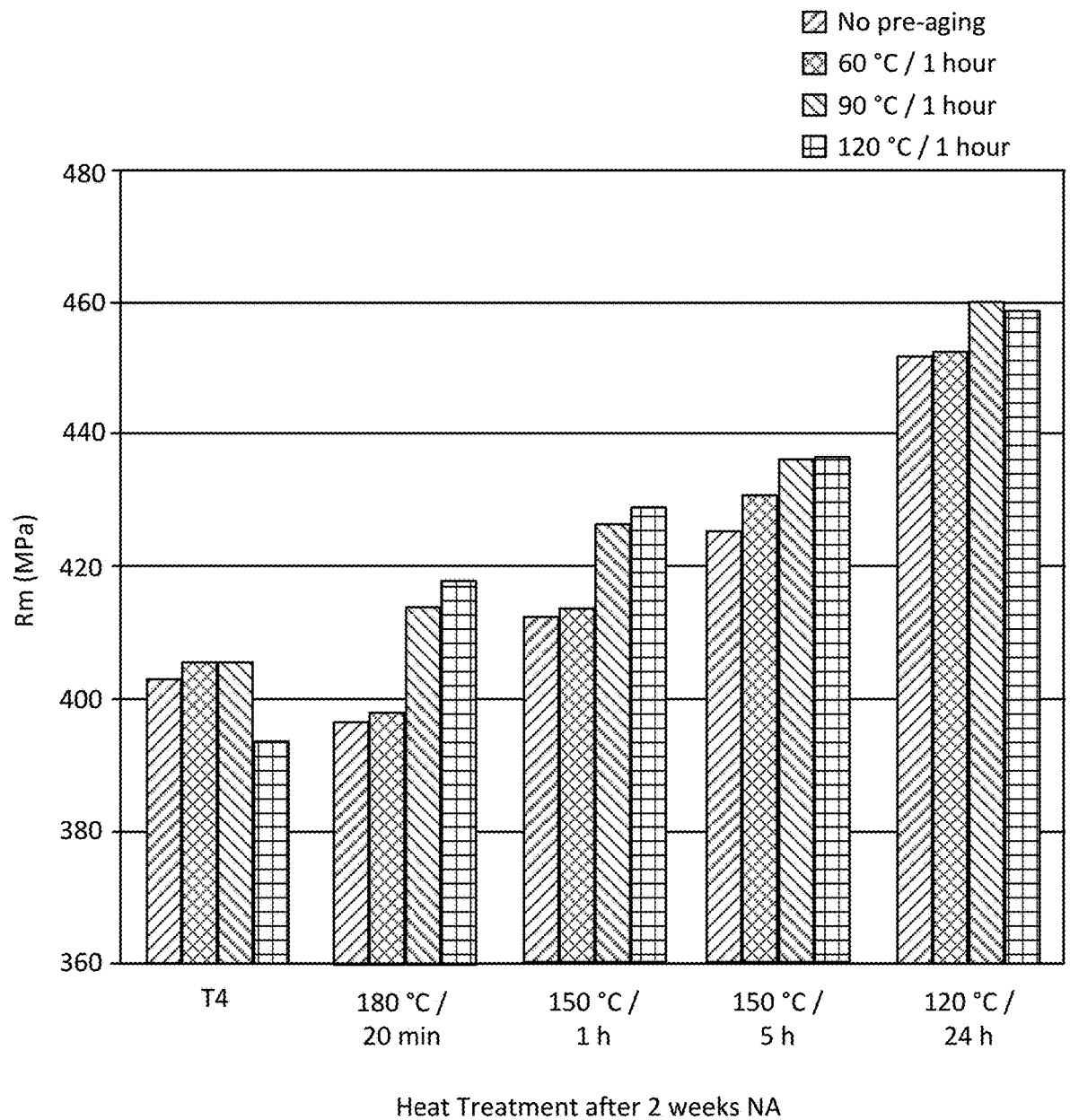
FIG. 7 is a graph showing the tensile strengths of exemplary alloys after various heat treatments.

FIGS. 6 and 7 show the effects of combining pre-aging and artificial aging on yield strength (Rp, FIG. 6) and tensile strength (Rm, FIG. 7) of exemplary alloys in T4 temper and after subjecting to heat treatment at various temperatures for various periods after two weeks of natural aging, as indicated in the figure. Pre-aging was performed by heating samples to temperatures of 60° C. (second from left histogram in each group), 90° C. (third from left histogram in each group), or 120° C. (right histogram in each group) and maintaining the temperature for 1 hour. Additionally, a control sample not subjected to pre-aging was tested (left histogram in each group). Artificial aging was performed at 180° C. for 20 minutes (second from left group of histograms), 150° C. for 1 hour (third from left group of histograms), 150° C. for 5 hours (fourth from left group of histograms), and 120° C. for 24 hours (right group of histograms). Additionally, a control group not subjected to artificial aging (left group of histograms) was tested.

EXAMPLE 4

Clad Aluminum Alloy Post-Production Properties

Figure 8:
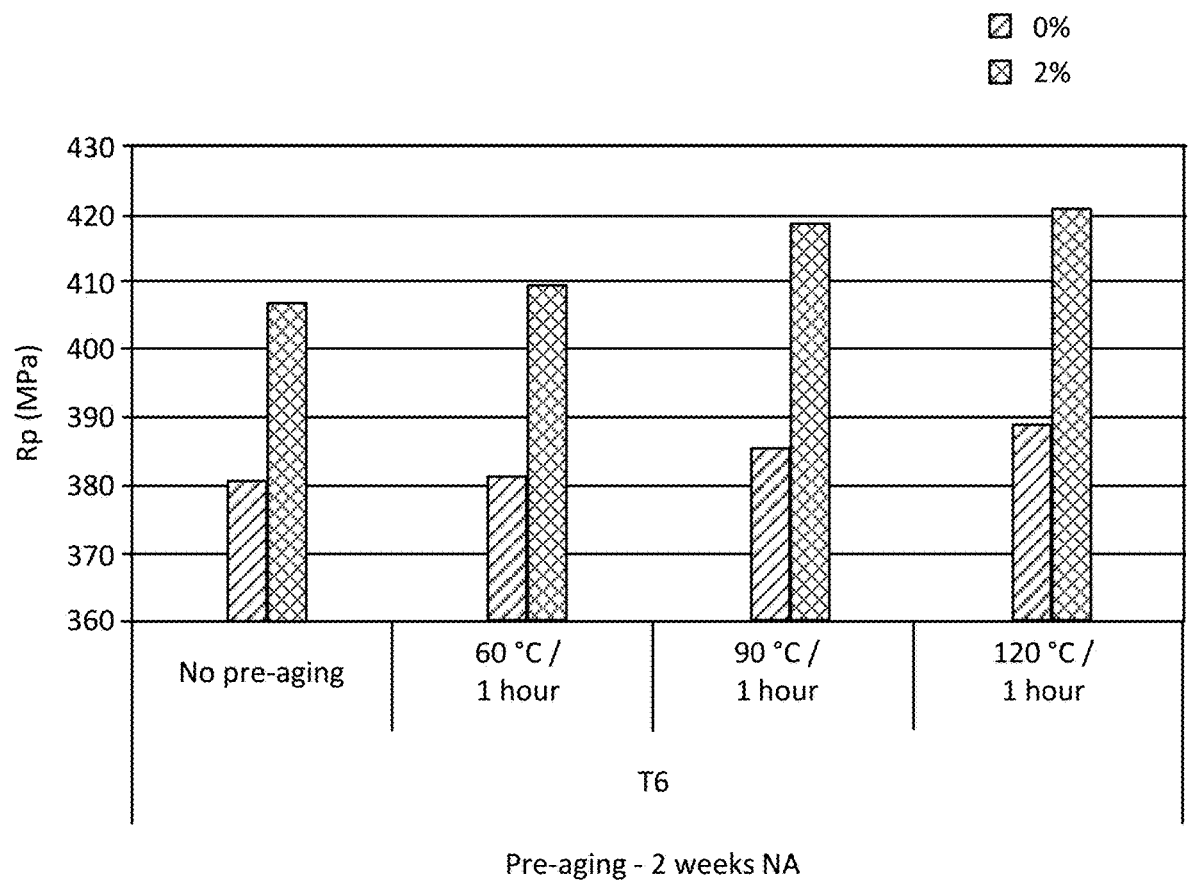
FIG. 8 is a graph showing the yield strengths of exemplary alloys after a pre-straining and heat treatment procedure.
Figure 9:
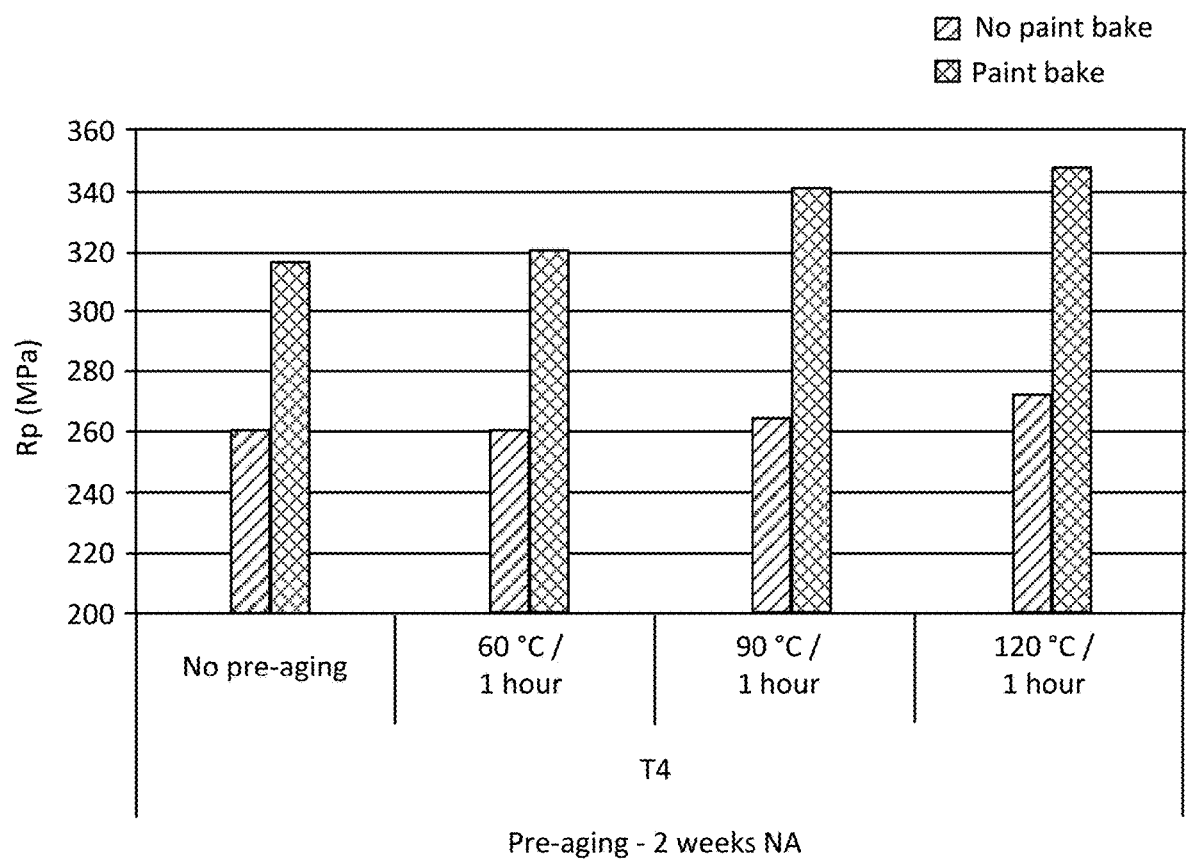
FIG. 9 is a graph showing the yield strengths of exemplary alloys after a paint bake procedure.
Figure 10:
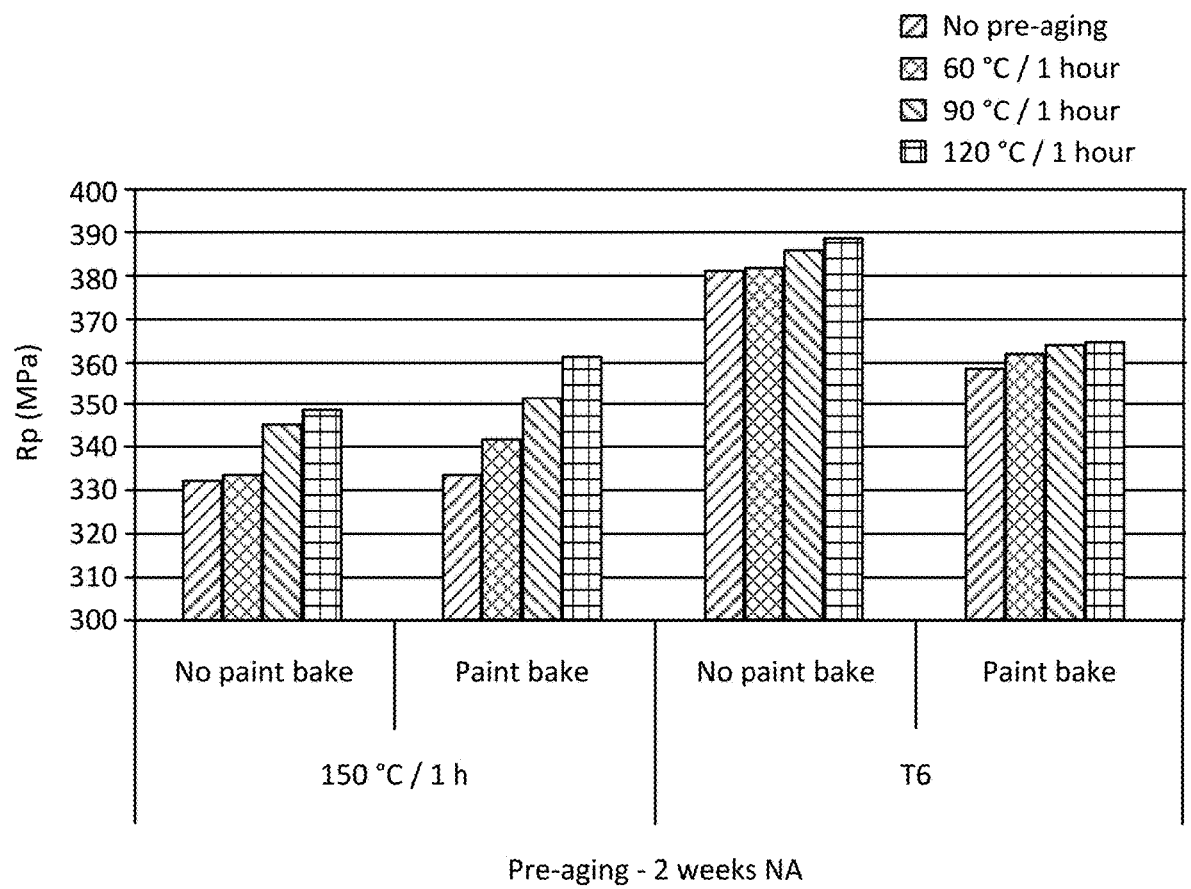
FIG. 10 is a graph showing the yield strengths of exemplary alloys after a heat treatment and paint bake procedure.

Downstream processing of the Sample A product (Table 8) was performed, including forming the sheets into aluminum alloy parts and coating the aluminum alloy parts. FIGS. 8, 9, and 10 show the effects of further processing of aluminum alloys on yield strength (Rp). FIG. 8 shows the effect of pre-straining on exemplary aluminum alloy samples pre-aged and naturally aged (referred to as "NA") for 2 weeks. Samples were pre-strained 2% (right histogram in each group). Additionally, a control group not subjected to pre-straining (left histogram in each group) was tested. Pre-aging was performed by heating samples to temperatures of 60° C. (second from left group of histograms), 90° C. (third from left group of histograms), or 120° C. (right group of histograms) and maintaining the temperature for 1 hour. Additionally, a control sample not subjected to pre-aging was tested (left group of histograms).

FIG. 9 shows the effect of paint baking on exemplary aluminum alloy samples pre-aged and naturally aged (referred to as "NA") for 2 weeks. Samples were paint baked at a temperature of 180° C. for 30 minutes (right histogram in each group). Additionally, a control group not subjected to paint baking (left histogram in each group) was tested. Pre-aging was performed by heating samples to temperatures of 60° C. (second from left group of histograms), 90° C. (third from left group of histograms), or 120° C. (right group of histograms) and maintaining the temperature for 1 hour. Additionally, a control sample not subjected to pre-aging was tested (left group of histograms).

FIG. 10 shows the effect of paint baking after pre-aging, natural aging, and artificial aging (referred to as "NA") for 2 weeks. Pre-aging was performed by heating samples to temperatures of 60° C. (second from left histogram in each group), 90° C. (third from left histogram in each group), or 120° C. (right histogram in each group) and maintaining the temperature for 1 hour. Additionally, a control sample not subjected to pre-aging was tested (left histogram in each group). Artificial aging was performed at 150° C. for 1 hour (left two groups of histograms), and to full T6 temper (right group of histograms). Paint baking was performed at 180° C. for 30 minutes.

Clad Aluminum Alloy Formability Properties

Figure 11:
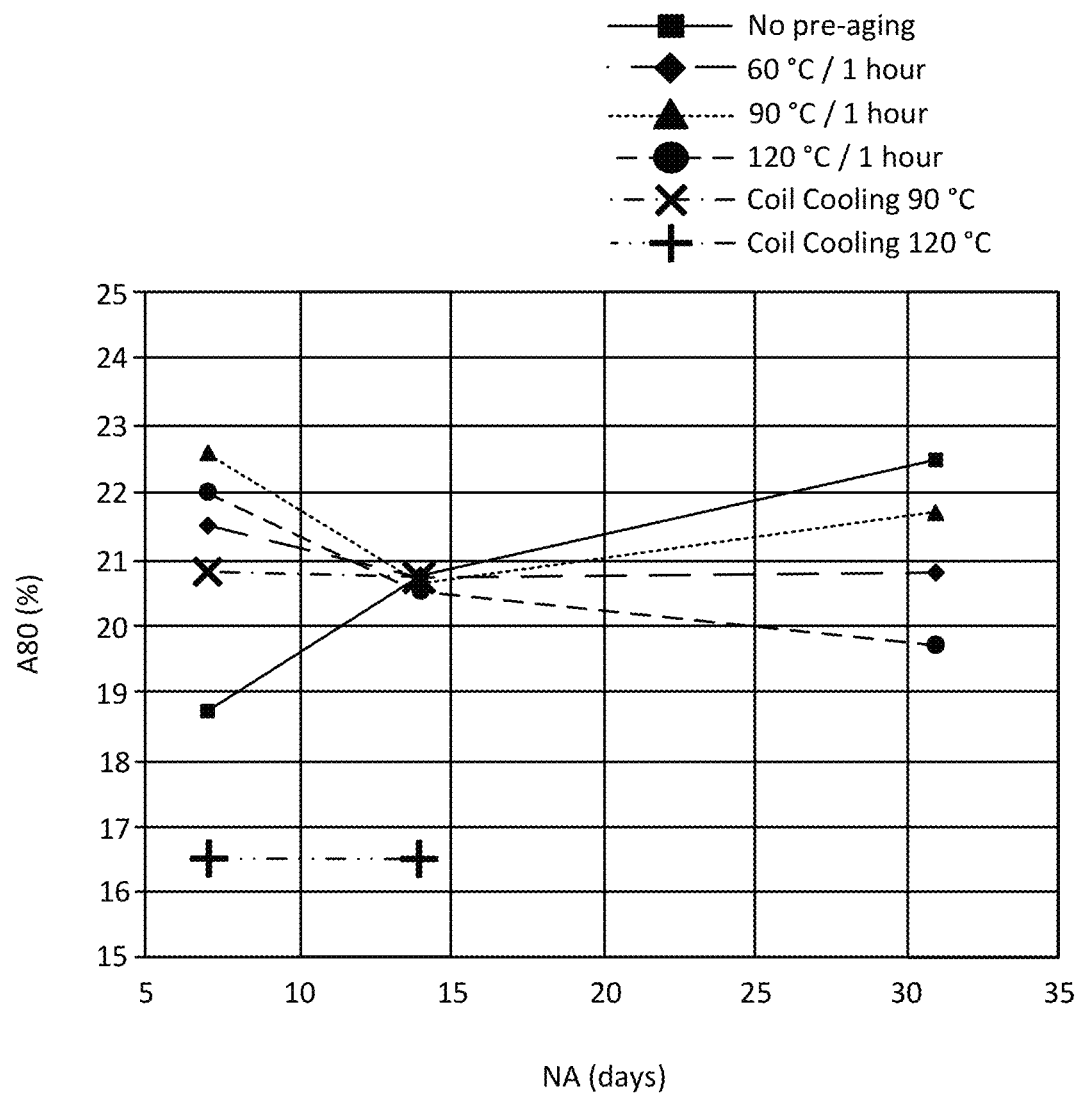
FIG. 11 is a graph showing the elongations of exemplary alloys after natural aging.

The formability properties of Sample A (Table 8) were assessed, as detailed below. FIG. 11 shows the effect of a pre-aging and natural aging (NA) heat treatment on formability (A80, y-axis) of exemplary aluminum alloy sheets in T4 temper. Pre-aging was performed by heating samples to temperatures of 60° C. (indicated by diamonds), 90° C. (indicated by triangles), or 120° C. (indicated by circles) and maintaining the temperature for 1 hour. Pre-aging was also performed by heating aluminum alloy sheet coils to 90° C. and allowing them to cool in air to simulate natural air cooling of a production coil (indicated by X) or by heating aluminum alloy sheet coils to 120° C. and allowing them to cool in air (indicated by +). Additionally, a control sample not subjected to pre-aging (indicated by squares) was tested. Pre-aging does not significantly affect elongation of the exemplary alloy. A coil cooling technique (e.g., by the natural air cooling of a production coil or by heating aluminum alloy sheet coils to an elevated temperature and allowing them to cool in air) does increase yield strength and does not substantially decrease elongation.

Figure 12:
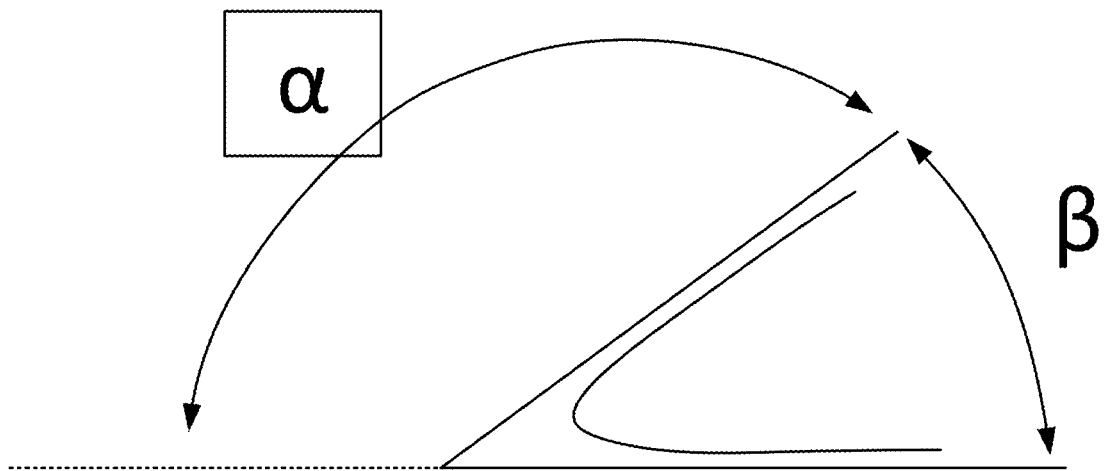
FIG. 12 is a schematic depicting bend test analysis.
Figure 13:
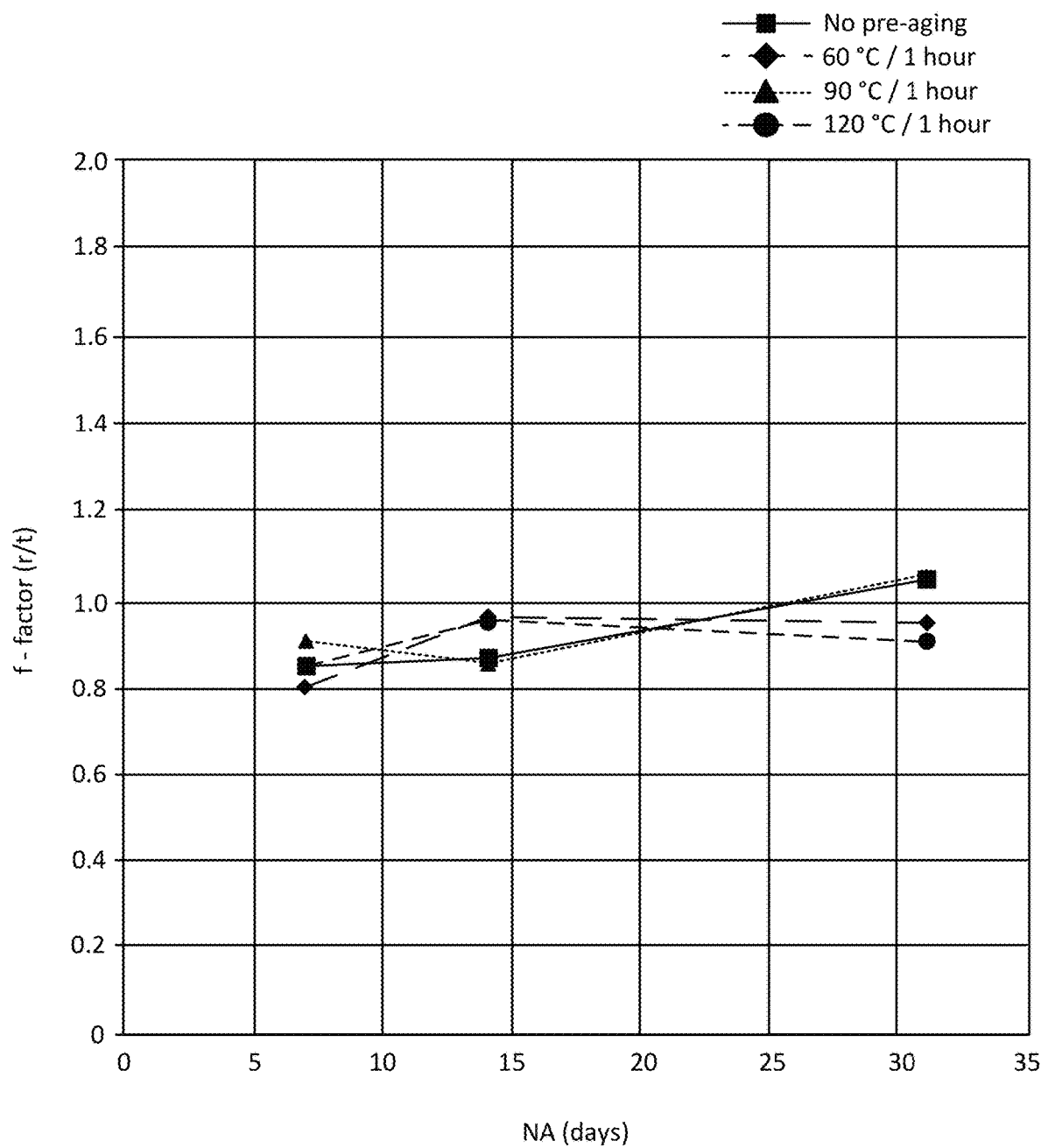
FIG. 13 is a graph showing the R/t ratios (f-factor) of exemplary alloys after pre-aging and natural aging.
Figure 14:
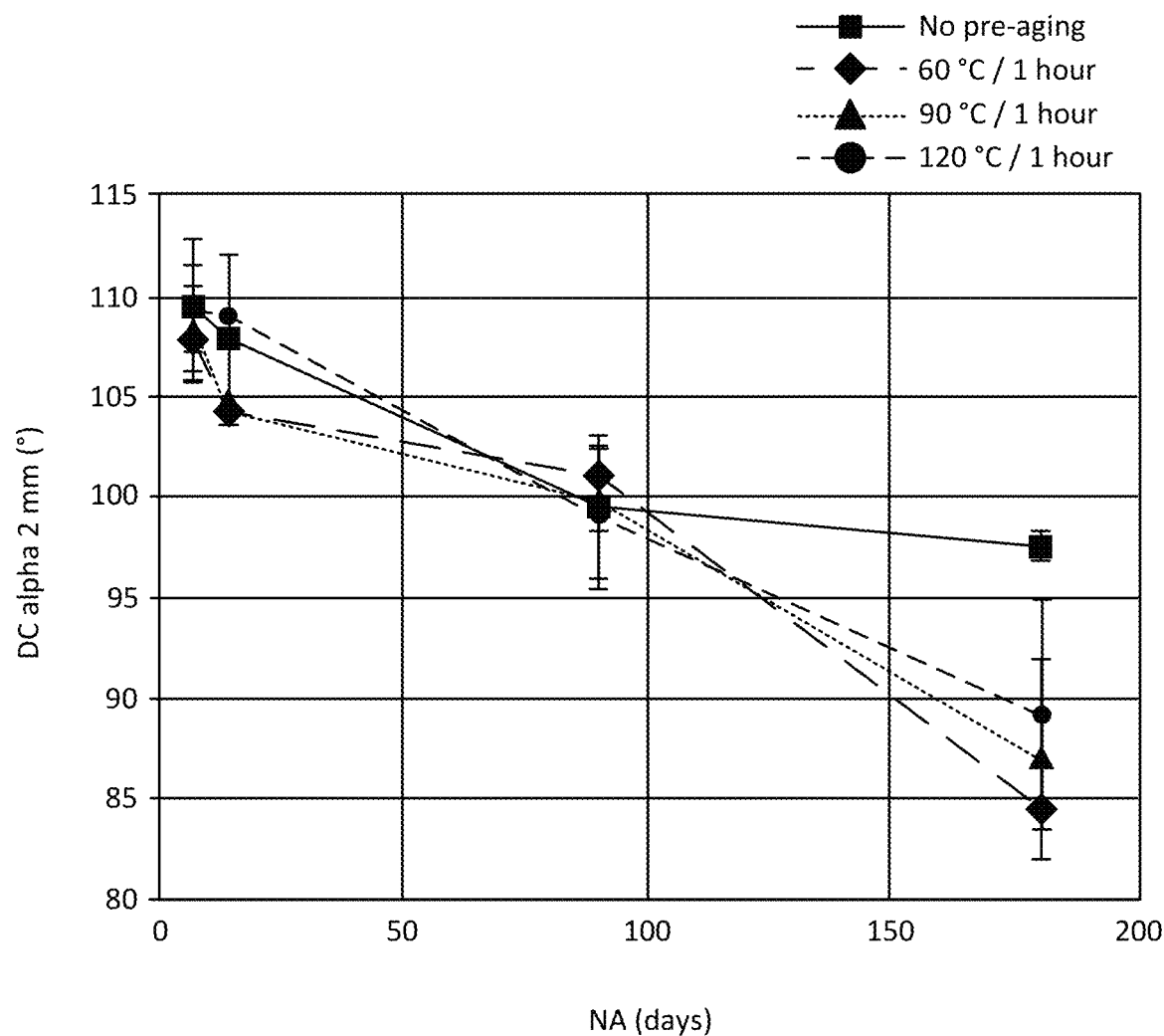
FIG. 14 is a graph showing the bend angle (DC alpha, normalized to 2.0 mm) (°)) of exemplary alloys after pre-aging and natural aging. Samples were evaluated after 7 days (left point), 14 days (second from left point), 60 days (third from left point), and 90 days (right point) of natural aging.

The bendability properties of Sample A (Table 8) were assessed. The bendability parameters of a bendability experiment are illustrated in FIG. 12. Bendability is described in terms of angle alpha ($\alpha$) or angle beta ($\beta$). FIG. 13 shows the effects of pre-aging and natural aging (NA) on bendability (r/t) of exemplary aluminum alloys described herein. Pre-aging was performed by heating samples to temperatures of 60° C. (indicated by diamonds), 90° C. (indicated by triangles) or 120° C. (indicated by circles) and maintaining the temperature for 1 hour. Additionally, a control sample not subjected to pre-aging (indicated by squares in FIG. 13) was tested. FIG. 14 shows the effects of pre-aging and natural aging (NA) on bend angle (DC alpha) of exemplary aluminum alloys described herein. Pre-aging was performed by heating samples to temperatures of 60° C. (indicated by diamonds), 90° C. (indicated by triangles) or 120° C. (indicated by circles) and maintaining the temperature for 1 hour. Additionally, a control sample not subjected to pre-aging (indicated by squares in FIG. 14) was tested. Bendability degraded with natural aging.

Figure 15:
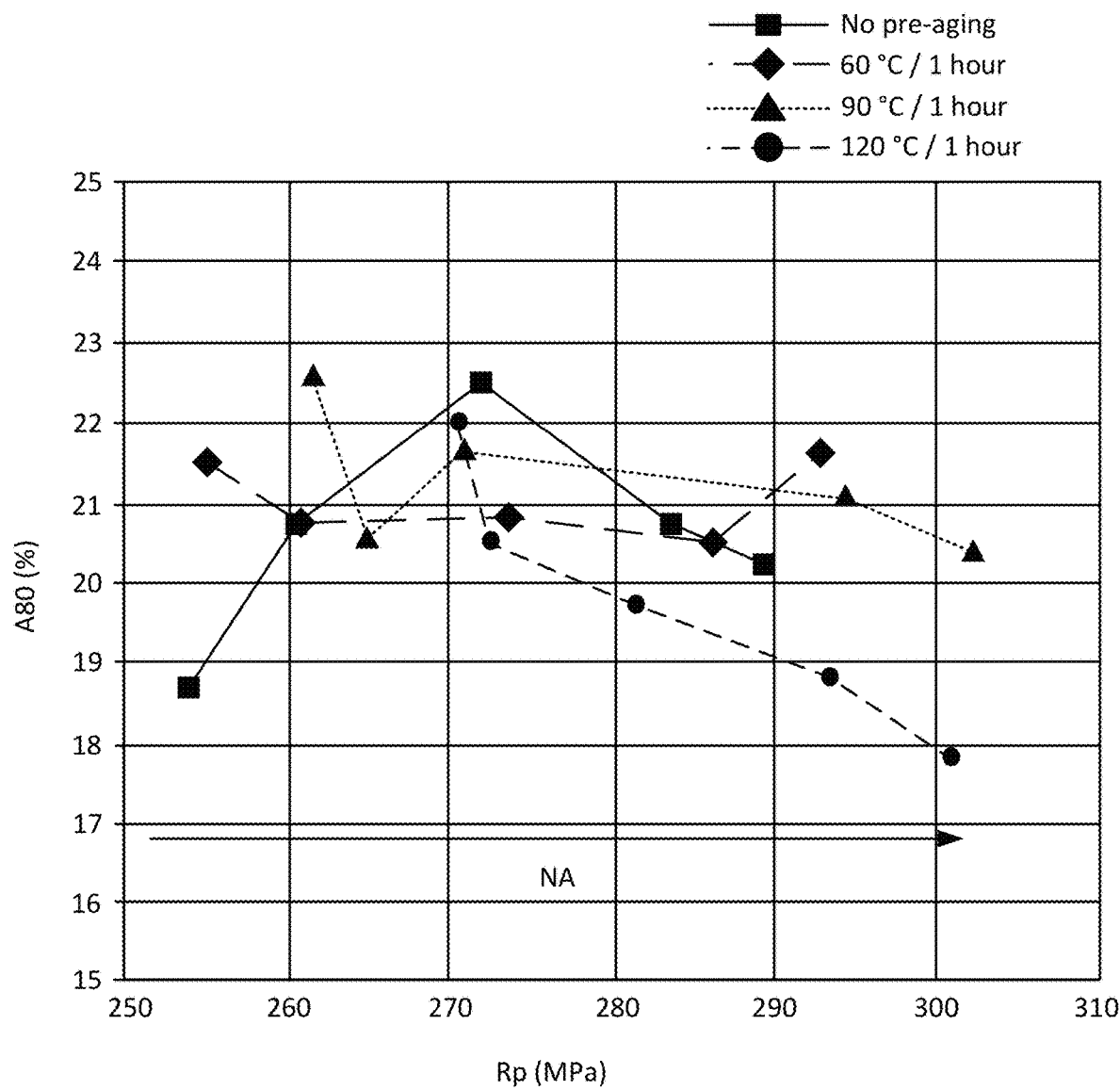
FIG. 15 is a graph showing the elongations (A80) of exemplary alloys as a function of yield strength (Rp) after various pre-aging and natural aging. Samples were evaluated after 7 days (left point), 14 days (second from left point), 31 days (center point), 60 days (second from right point), and 90 days (right point) of natural aging.
Figure 16:
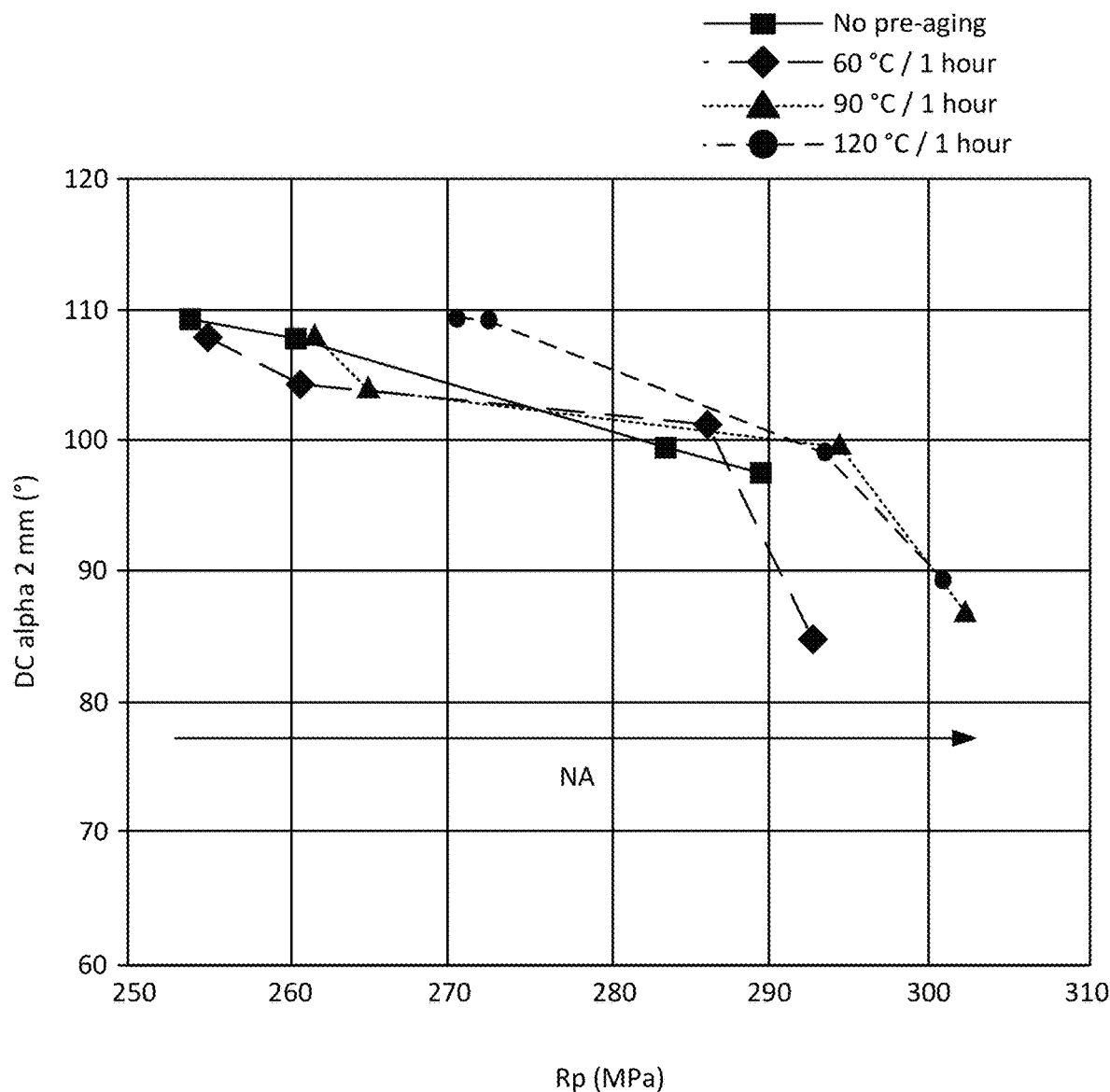
FIG. 16 is a graph showing bend angle (DC alpha, normalized to 2.0 mm) (°)) of exemplary alloys as a function of yield strength (Rp) after various pre-aging and natural aging. Samples were evaluated after 7 days (left point), 14 days (second from left point), 60 days (third from left point), and 90 days (right point) of natural aging.

FIGS. 15 and 16 show the effects of pre-aging and natural aging on formability (A80 and DC alpha) and yield strength (Rp) of exemplary aluminum alloys in T4 temper. Pre-aging was performed by heating samples to temperatures of 60° C. (indicated by diamonds), 90° C. (indicated by triangles) or 120° C. (indicated by circles) and maintaining the temperature for 1 hour. Additionally, a control sample not subjected to pre-aging (indicated by squares) was tested. Natural aging was performed by storing the alloys for 7 days (left point in each line and scatter plot), 14 days (center point in each line and scatter plot), and 31 days (right point in each line and scatter plot). FIG. 15 shows the effects on alloy elongation (A80). FIG. 16 shows the effects on bend angle (DC alpha).

Figure 17:
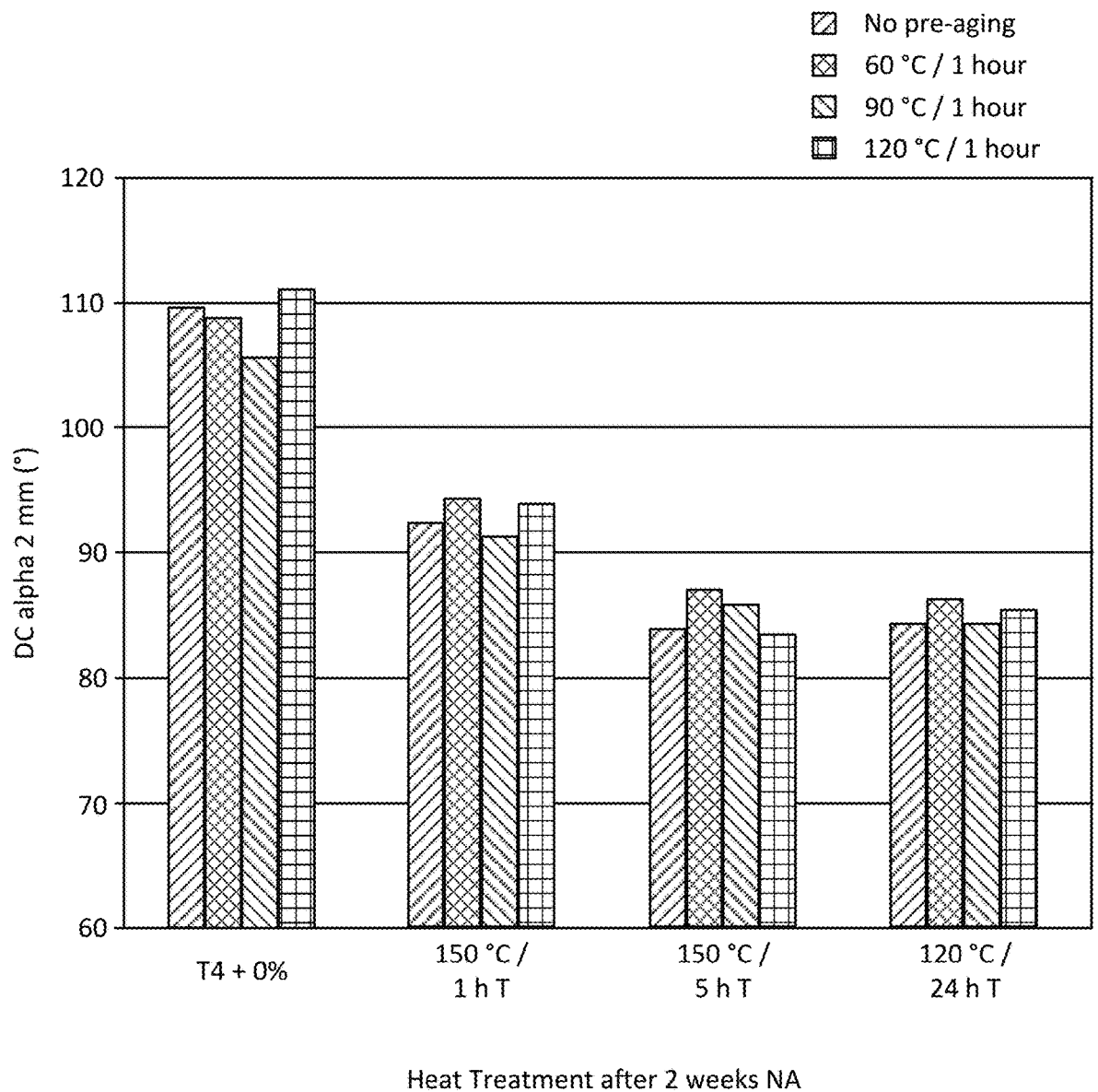
FIG. 17 is a graph showing the bend angles (DC alpha, normalized to 2.0 mm) (°)) of exemplary alloys after pre-aging and artificial aging procedures.

FIG. 17 shows the effects of combining pre-aging and natural aging on bend angle (DC alpha) of exemplary aluminum alloys in T4 (left grouping of histograms) and T6 temper (right three groupings of histograms). Pre-aging was performed by heating samples to temperatures of 60° C. (second from left histogram in each group), 90° C. (third from left histogram in each group) or 120° C. (right histogram in each group) and maintaining the temperature for 1 hour. Additionally, a control sample not subjected to pre-aging (indicated by squares) was tested (left histogram in each group). Artificial aging was performed at 150° C. for 1 hour (second from left group of histograms), 150° C. for 5 hours (third from left group of histograms), and 120° C. for 24 hours (right group of histograms). Additionally, a control group in T4 temper and not subjected to artificial aging (left group of histograms) was tested. Bendability decreased as strength increased.

TABLE 11

| Sample | Core Layer | Cladding Layer | Number of Cladding Layers | Cladding Layer Thickness |
|---|---|---|---|---|
| L | Alloy 3 | Alloy 9 | 2 | Each layer is 10% of the total thickness of the clad product |
| M | Alloy 3 | Alloy 5 | 2 | Each layer is 10% of the total thickness of the clad product |
| N | Alloy 3 | Alloy 8 | 2 | Each layer is 10% of the total thickness of the clad product |

Figure 18A:
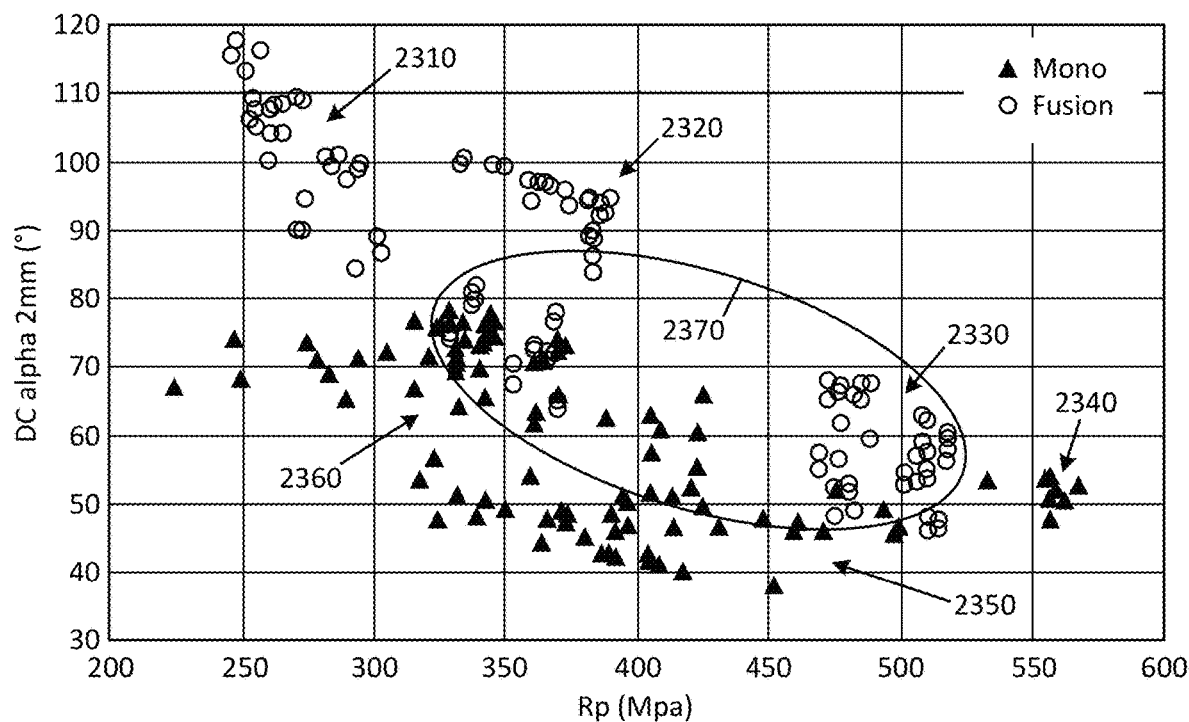
FIG. 18A is a graph showing the bendability (DC alpha, normalized to 2.0 mm) (°)) and yield strengths (Rp (MPa)) for alloys prepared and processed according to methods described herein.

The bendability versus strength properties of Sample A (Table 8), Samples L, M, and N (Table 11), and Alloy 3 and Alloy 2 (Table 7) were assessed, as detailed below. FIG. 18A is a graph showing the bendability (DC alpha, normalized to 2.0 mm (°), performed according to VDA standard 238-100) versus yield strength (Rp (MPa)) for alloys prepared and processed according to methods described above. Sample A in T4 temper 2310 exhibited excellent bendability and a yield strength ranging from about 250 MPa to about 300 MPa. Sample A in T6 temper 2320 exhibited excellent bendability and a yield strength ranging from about 325 MPa to about 400 MPa. Alloy 3 clad with any of Alloy 9 (Sample L), Alloy 5 (Sample M), or Alloy 8 (Sample N) in T6 temper 2330 exhibited excellent strength and bend angles ranging from about 45° to about 70°. Alloy 3 in T6 temper 2340 exhibited high strength and bend angles ranging from about 45° to about 55°. Alloy 2 in T6 temper 2350 exhibited high strength and bend angles ranging from about 35° to about 65°. Alloy 2 in T4 temper 2360 exhibited yield strengths ranging from about 225 MPa to about 375 MPa and bend angles ranging from about 60° to about 80°. As shown in FIG. 18A, aluminum alloys having a cladding layer (Sample A in T6 temper 2320 and Alloy 3 clad with any of Alloy 9 (Sample L), Alloy 5 (Sample M), or Alloy 8 (Sample N) in T6 temper 2330) exhibited optimal bendability and strength properties. The properties of Alloy 3 clad with any of Alloy 9 (Sample L), Alloy 5 (Sample M), or Alloy 8 (Sample N) in T6 temper 2330 fall within the optimal zone 2370.

Figure 18B:
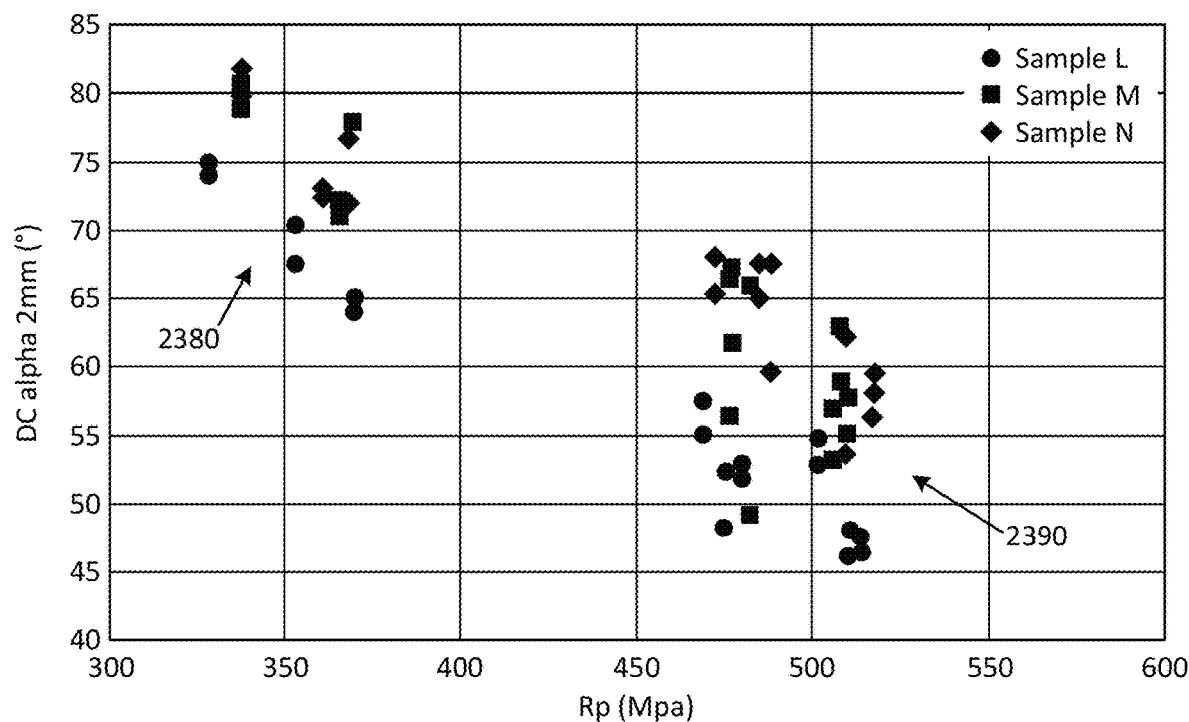
FIG. 18B is a graph showing the bendability (DC alpha, normalized to 2.0 mm) (°)) and yield strengths (Rp (MPa)) for alloys prepared and processed according to methods described herein.

FIG. 18B is a graph showing the bendability (DC alpha, normalized to 2.0 mm) versus yield strength (Rp (MPa)) for alloys prepared and processed according to methods described above. Samples L, M, and N (Table 11) were assessed, as detailed below. Samples L, M, and N in T4 temper 2380 and Samples L, M, and N in T6 temper 2390 were analyzed to show the effect of aging on the alloys. Samples L, M, and N in T4 temper 2380 exhibited greater bendability than Samples L, M, and N in T6 temper 2390. Likewise, Samples L, M, and N in T6 temper 2390 exhibited greater strength than Samples L, M, and N in T4 temper 2380. As shown in FIG. 18B, the Alloy 5 cladding layer (data indicated by solid squares) and Alloy 8 cladding layer (data indicated by solid diamonds) improved the bendability (i.e., formability) of Alloy 3 when compared to cladding layer Alloy 9 (data indicated by solid circles).

Clad Aluminum Alloy Corrosion Resistance

The corrosion resistance properties of Sample A were assessed, as detailed below. Corrosion testing was performed according to ASTM standard G34, Standard Test Method for Exfoliation Corrosion Susceptibility in 2xxx and 7xxx Series Aluminum Alloys (EXCO Test).

Figure 19:
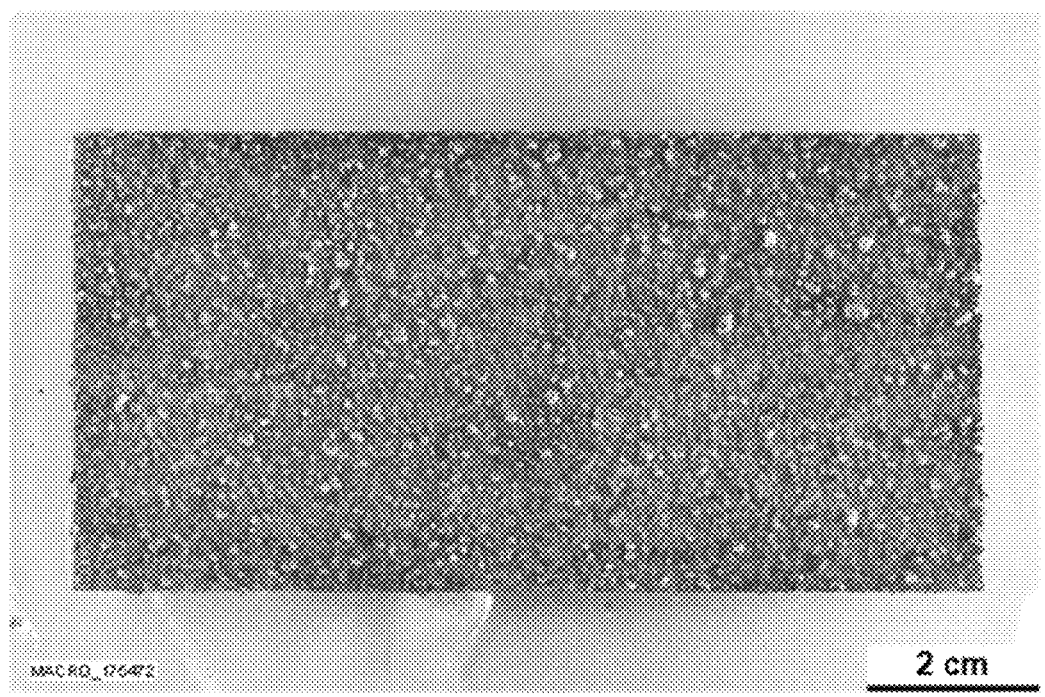
FIG. 19 is a digital image showing corrosion on a comparative non-clad aluminum alloy sample (i.e., a monolithic 7xxx series aluminum alloy without a 5xxx clad layer).
Figure 20:
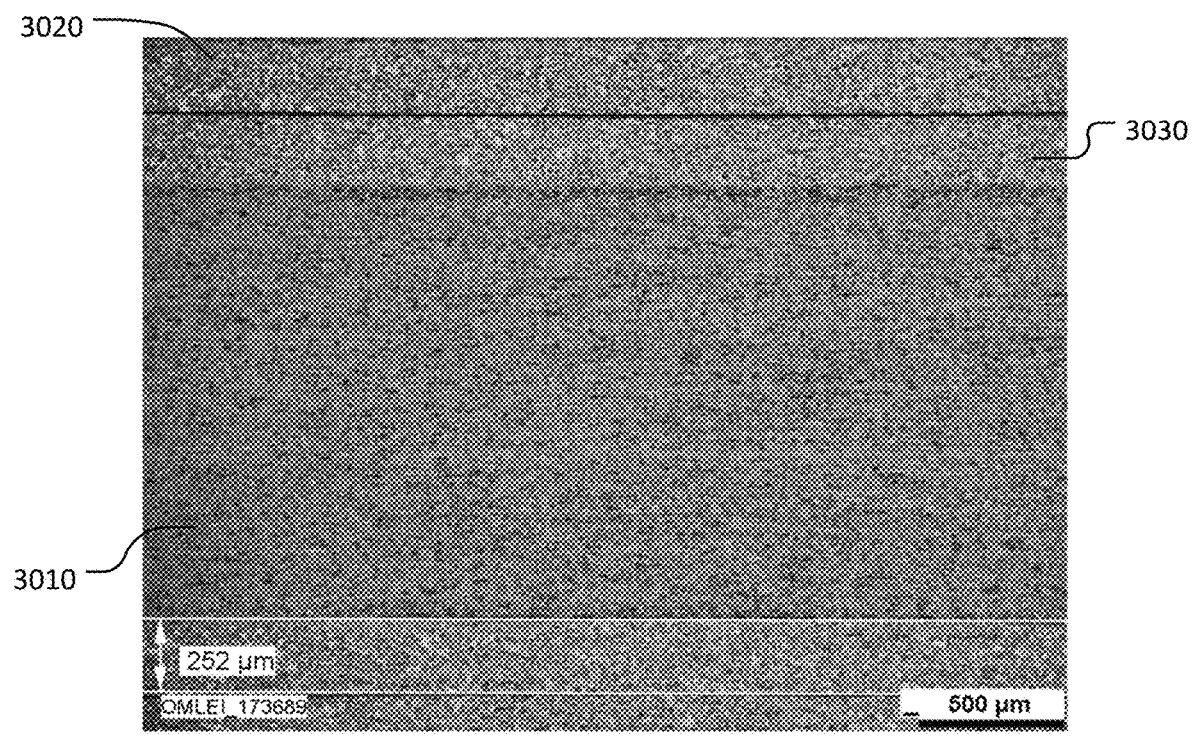
FIG. 20 is a micrograph showing microstructure of an exemplary clad aluminum alloy sample (i.e., a 7xxx series aluminum alloy core layer with a 5xxx clad layer) in a T4 temper.

FIG. 19 shows the effect of corrosion testing on Alloy 2. FIG. 20 is a micrograph showing the microstructure of Sample A. The sample was taken from an outer edge across a width of the aluminum alloy sheet. The outer edge sample exhibited a slightly higher degree of recrystallization near the core-clad interface 3030.

Clad Aluminum Alloy Interface

Figure 21:
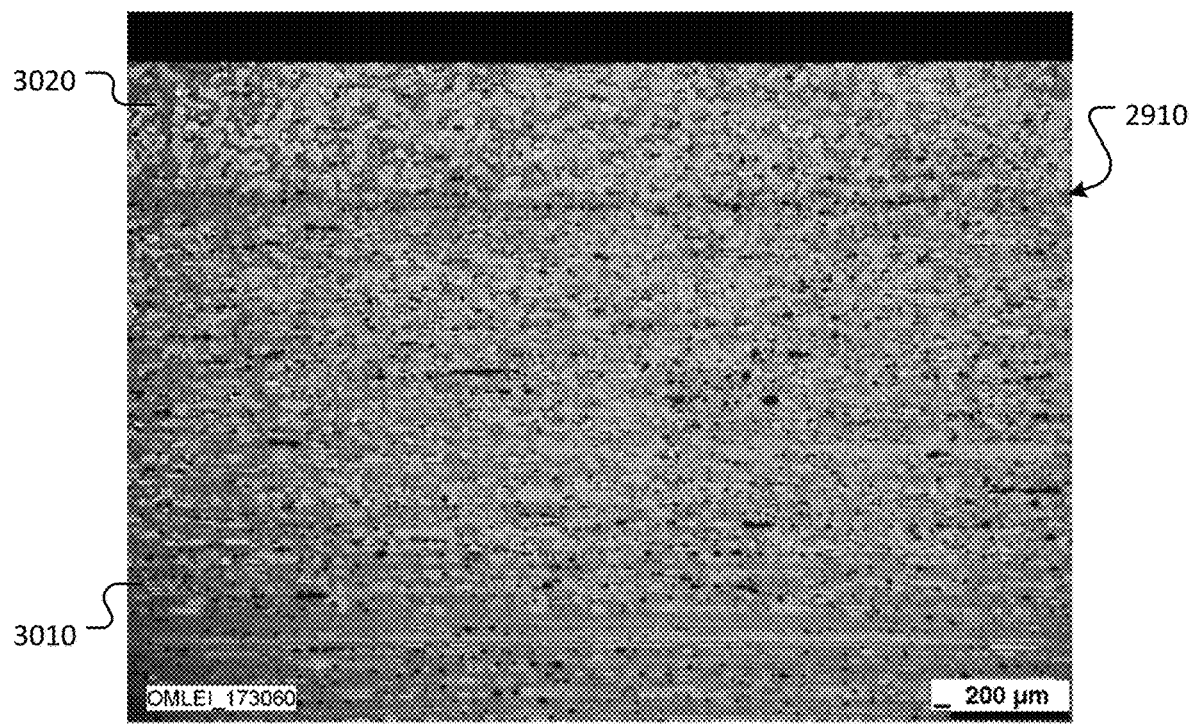
FIG. 21 is a micrograph showing microstructure of an exemplary clad aluminum alloy sample (i.e., a 7xxx series aluminum alloy core layer with a 5xxx clad layer) in a T4 temper.

FIG. 21 shows a microstructure and the interfacial transition zones of Sample A. FIG. 21 is a micrograph taken from a sample extracted 100 m from a leading edge of Sample A.

Joining

Figure 22A:
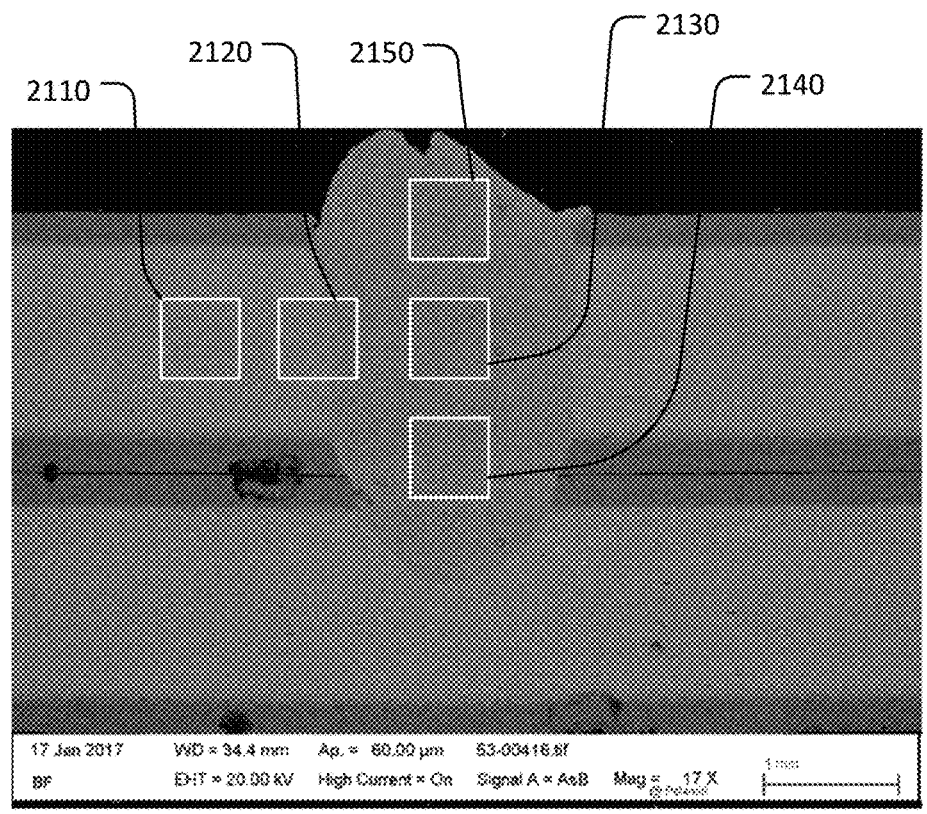
FIG. 22A is a micrograph image showing a partial penetration weld of an exemplary clad aluminum alloy sample having a 7xxx series aluminum alloy core layer with a 5xxx clad layer in a T6 temper.
Figure 22B:
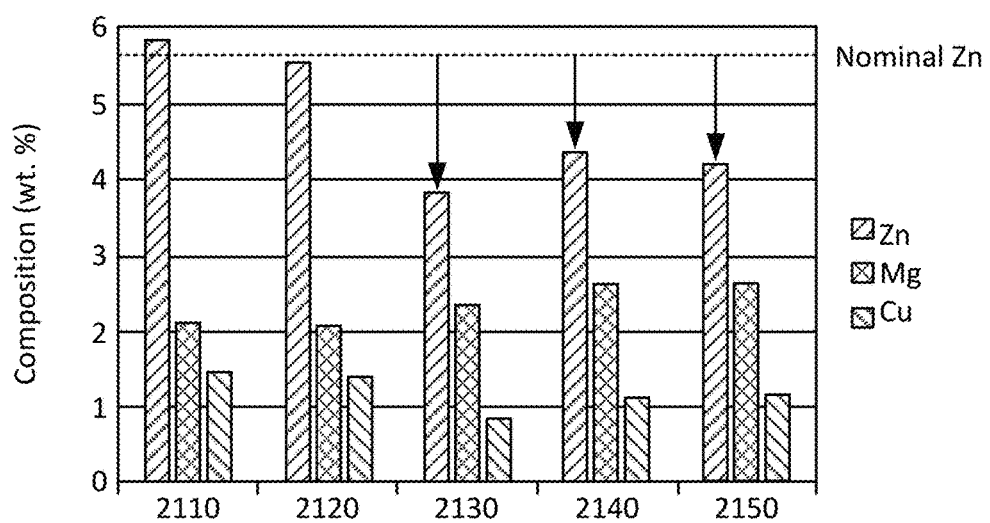
FIG. 22B is a graph showing the zinc, magnesium, and copper content from various areas of a partial penetration weld.

Exemplary clad aluminum alloy samples were prepared according to methods described above. Two samples were cut from Sample A (see Table 8) to substantially similar dimensions and welded together via a partial penetration weld technique. No cracking was observed in a heat affected zone (HAZ) about the weld. FIG. 22A is a cross-sectional micrograph of the weld. Five different zones, including a core 2110, a bead edge 2120, a bead center 2130, a bead root 2140, and a bead surface 2150, were evaluated for composition. FIG. 22B is a graph showing the chemical composition in each zone. The composition of the weld bead was homogeneous, with lower Zn and higher Mg content attributed to the Alloy 5 aluminum alloy cladding layer dissolving in a weld pool during welding. The reduced Zn content is indicated with a departure from a nominal Zn line (indicated by small dashes).

Figure 23A:
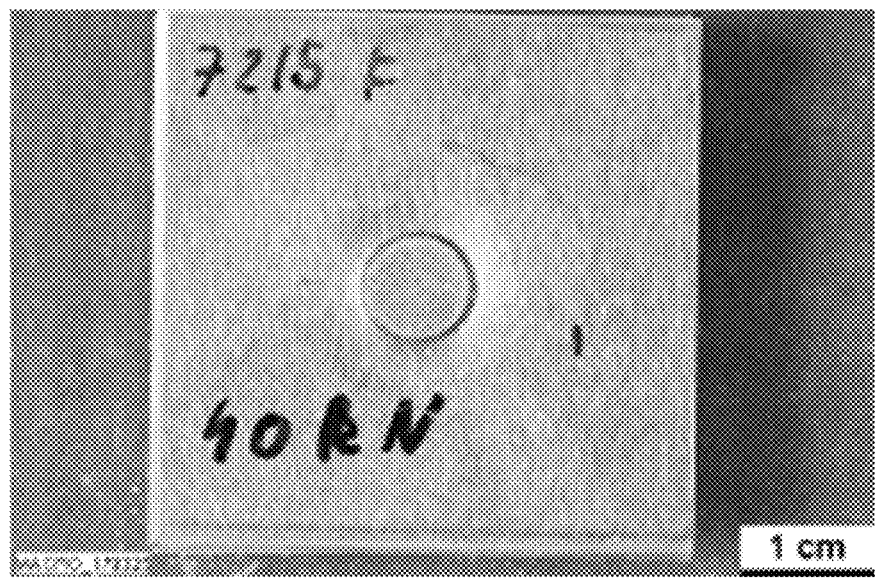
FIG. 23A is a digital image showing riveted exemplary clad aluminum alloy samples having a 7xxx series aluminum alloy core layer with a 5xxx clad layer in F, T4, and T6 tempers.
Figure 23B:
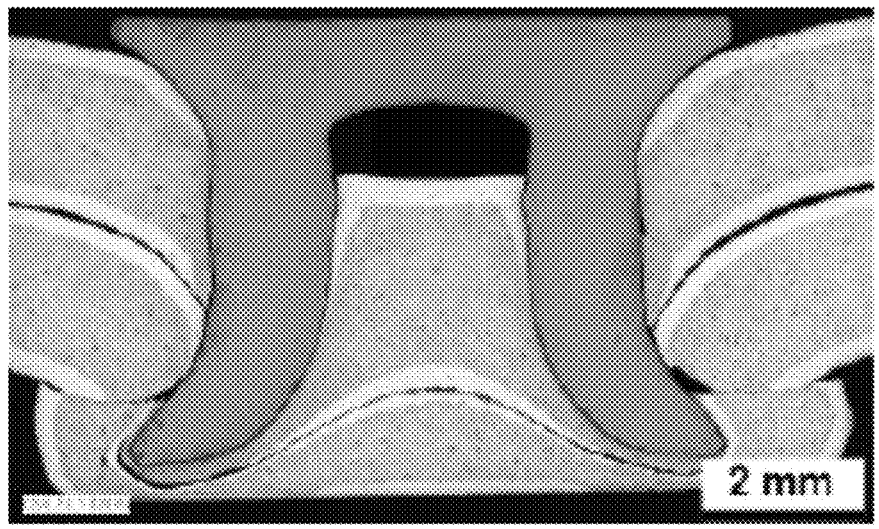
FIG. 23B is a micrograph image showing a cross section of the riveted exemplary clad aluminum alloy samples.

Exemplary clad aluminum alloy samples were prepared according to methods described above. Two samples were cut from Sample A (see Table 8) to substantially similar dimensions and riveted together. Samples prepared for riveting were in an F temper, a T4 temper, and a T6 temper. FIG. 23A is a digital image showing a top view of the riveted samples. FIG. 23B is a cross-sectional micrograph of the riveted samples.

Illustrations of Suitable Products

As used below, any reference to a series of illustrations is to be understood as a reference to each of those illustrations disjunctively (e.g., "Illustrations 1-4" is to be understood as "Illustrations 1, 2, 3, or 4").

Illustration 1 is a clad aluminum alloy product, comprising: a core layer comprising up to 12.0 wt. % Zn, 1.0 to 4.0 wt. % Mg, 0.1 to 3.0 wt. % Cu, up to 0.60 wt. % Si, up to 0.50 wt. % Fe, up to 0.20 wt. % Mn, up to 0.20 wt. % Cr, up to 0.30 wt. % Zr, up to 0.15 wt. % impurities, and the balance aluminum, wherein the core layer has a first side and a second side; and a first cladding layer on the first side of the core layer, wherein the first cladding layer comprises up to about 7.0 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum.

Illustration 2 is the clad aluminum alloy product of any preceding or subsequent illustration, wherein the core layer comprises about 5.0 to 9.5 wt. % Zn, 1.2 to 2.3 wt. % Mg, 0.10 to 2.6 wt. % Cu, up to 0.10 wt. % Si, up to 0.15 wt. % Fe, up to 0.05 wt. % Mn, up to 0.05 wt. % Cr, up to 0.25 wt. % Zr, up to 0.15 wt. % impurities, and the balance aluminum.

Illustration 3 is the clad aluminum alloy product of any preceding or subsequent illustration, wherein the first cladding layer comprises up to about 6.0 wt. % Zn, 0.1 to 3.5 wt. % Mg, up to 0.3 wt. % Cu, 0.05 to 0.40 wt. % Si, 0.20 to 0.40 wt. % Fe, 0.10 to 0.80 wt. % Mn, up to 0.30 wt. % Cr, up to 0.25 wt. % Zr, up to 0.15 wt. % impurities, and the balance aluminum.

Illustration 4 is the clad aluminum alloy product of any preceding or subsequent illustration, wherein the first cladding layer comprises up to about 1.3 wt. % Zn, 0.05 to 2.0 wt. % Mg, up to 0.35 wt. % Cu, 0.6 to 13.5 wt. % Si, 0.10 to 0.80 wt. % Fe, up to 0.80 wt. % Mn, up to 0.35 wt. % Cr, up to 0.30 wt. % Zr, up to 0.15 wt. % impurities, and the balance aluminum.

Illustration 5 is the clad aluminum alloy product of any preceding or subsequent illustration, wherein the first cladding layer comprises up to about 0.5 wt. % Zn, 4.0 to 4.8 wt. % Mg, up to 0.1 wt. % Cu, 0.05 to 0.2 wt. % Si, 0.20 to 0.40 wt. % Fe, 0.1 to 0.8 wt. % Mn, up to 0.2 wt. % Cr, up to 0.25 wt. % Zr, up to 0.15 wt. % impurities, and the balance aluminum.

Illustration 6 is the clad aluminum alloy product of any preceding or subsequent illustration, wherein the core layer has a thickness of about 0.5 to 3 mm.

Illustration 7 is the clad aluminum alloy product of any preceding or subsequent illustration, wherein the core layer has a thickness of about 0.7 to 2.3 mm.

Illustration 8 is the clad aluminum alloy product of any preceding or subsequent illustration, wherein the core layer has a thickness of about 2 mm.

Illustration 9 is the clad aluminum alloy product of any preceding or subsequent illustration, wherein the first cladding layer has a thickness of about 1 to 25% of a total thickness of the clad aluminum alloy product.

Illustration 10 is the clad aluminum alloy product of any preceding or subsequent illustration, wherein the first cladding layer has a thickness of about 1 to 12% of the total thickness of the clad aluminum alloy product.

Illustration 11 is the clad aluminum alloy product of any preceding or subsequent illustration, wherein the first cladding layer has a thickness of about 10% of the total thickness of the clad aluminum alloy product.

Illustration 12 is the clad aluminum alloy product of any preceding or subsequent illustration, further comprising a second cladding layer located on the second side of the core layer.

Illustration 13 is the clad aluminum alloy product of any preceding or subsequent illustration, wherein the first cladding layer and the second cladding layer comprise the same or different alloys.

Illustration 14 is the clad aluminum alloy product of any preceding or subsequent illustration, wherein the second cladding layer comprises up to about 7.0 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum.

Illustration 15 is the clad aluminum alloy product of any preceding or subsequent illustration, wherein the second cladding layer comprises up to about 6.0 wt. % Zn, 0.1 to 3.5 wt. % Mg, up to 0.3 wt. % Cu, 0.05 to 0.40 wt. % Si, 0.20 to 0.40 wt. % Fe, 0.10 to 0.80 wt. % Mn, up to 0.30 wt. % Cr, up to 0.25 wt. % Zr, up to 0.15 wt. % impurities, and the balance aluminum.

Illustration 16 is the clad aluminum alloy product of any preceding or subsequent illustration, wherein the clad aluminum alloy product has a yield strength up to 600 MPa.

Illustration 17 is the clad aluminum alloy product of any preceding or subsequent illustration, wherein the clad aluminum alloy product has a yield strength of 550 MPa.

Illustration 18 is the clad aluminum alloy product of any preceding or subsequent illustration, wherein the clad aluminum alloy product has an elongation up to 20%.

Illustration 19 is the clad aluminum alloy product of any preceding or subsequent illustration, wherein the clad aluminum alloy product has an elongation up to 15%.

Illustration 20 is an automotive structural part comprising the clad aluminum alloy product of any preceding or subsequent illustration.

Illustration 21 is an electronic device housing comprising the clad aluminum alloy product of any preceding or subsequent illustration.

Illustration 22 is an aerospace structural part or an aerospace non-structural part comprising the clad aluminum alloy product of any preceding or subsequent illustration.

Illustration 23 is a marine structural part or a marine non-structural part comprising the clad aluminum alloy product of any preceding or subsequent illustration.

Illustration 24 is an aluminum alloy blank comprising the clad aluminum alloy product of any preceding or subsequent illustration.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A clad aluminum alloy product, comprising:
    a core layer comprising up to about 12.0 wt. % Zn, 1.0 to 4.0 wt. % Mg, 0.1 to 3.0 wt. % Cu, up to 0.60 wt. % Si, up to 0.50 wt. % Fe, up to 0.20 wt. % Mn, up to 0.20 wt. % Cr, up to 0.30 wt. % Zr, up to 0.15 wt. % impurities, and the balance aluminum, wherein the core layer has a first side and a second side;
    a first cladding layer on the first side of the core layer, wherein the first cladding layer comprises up to about 0.5 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum; and
    a second cladding layer located on the second side of the core layer and comprising up to about 7.0 wt. % Zn, up to 6.0 wt. % Mg, up to 0.35 wt. % Cu, 0.05 to 13.5 wt. % Si, 0.10 to 0.90 wt. % Fe, up to 1.5 wt. % Mn, up to 0.35 wt. % Cr, up to 0.30 wt. % Zr, up to 0.15 wt. % impurities, and the balance aluminum.

2. The clad aluminum alloy product of claim 1, wherein the core layer comprises about 5.0 to 9.5 wt. % Zn, 1.2 to 2.3 wt. % Mg, 0.10 to 2.6 wt. % Cu, up to 0.10 wt. % Si, up to 0.15 wt. % Fe, up to 0.05 wt. % Mn, up to 0.05 wt. % Cr, up to 0.25 wt. % Zr, up to 0.15 wt. % impurities, and the balance aluminum.

3. The clad aluminum alloy product of claim 1, wherein the core layer has a thickness of about 0.5 to 3 mm.

4. The clad aluminum alloy product of claim 3, wherein the core layer has a thickness of about 0.7 to 2.3 mm.

5. The clad aluminum alloy product of claim 4, wherein the core layer has a thickness of about 2 mm.

6. The clad aluminum alloy product of claim 1, wherein the first cladding layer has a thickness of about 1 to 25% of a total thickness of the clad aluminum alloy product.

7. The clad aluminum alloy product of claim 6, wherein the first cladding layer has a thickness of about 1 to 12% of the total thickness of the clad aluminum alloy product.

8. The clad aluminum alloy product of claim 7, wherein the first cladding layer has a thickness of about 10% of the total thickness of the clad aluminum alloy product.

9. The clad aluminum alloy product of claim 1, wherein the clad aluminum alloy product has a yield strength up to 600 MPa.

10. The clad aluminum alloy product of claim 9, wherein the clad aluminum alloy product has a yield strength of 550 MPa.

11. The clad aluminum alloy product of claim 1, wherein the clad aluminum alloy product has an elongation up to 20%.

12. The clad aluminum alloy product of claim 11, wherein the clad aluminum alloy product has an elongation up to 15%.

13. The clad aluminum alloy product of claim 1, wherein the clad aluminum alloy product is a sheet, a plate, an electronic device housing, an automotive structural part, an aerospace structural part, an aerospace non-structural part, a marine structural part, or a marine non-structural part.

* * * * *